US011457580B2

(12) United States Patent
Chernov et al.

(10) Patent No.: US 11,457,580 B2
(45) Date of Patent: Oct. 4, 2022

(54) INDOOR GARDEN CENTER WITH A NUTRIENT CARTRIDGE SYSTEM

(71) Applicant: Haier US Appliance Solutions, Inc., Wilmington, DE (US)

(72) Inventors: Gregory Sergeevich Chernov, Louisville, KY (US); Matthew R. Hunter, Louisville, KY (US); Michael Goodman Schroeder, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 57 days.

(21) Appl. No.: 17/093,406

(22) Filed: Nov. 9, 2020

(65) Prior Publication Data

US 2022/0142073 A1 May 12, 2022

(51) Int. Cl.
*A01G 31/06* (2006.01)

(52) U.S. Cl.
CPC .................................. *A01G 31/06* (2013.01)

(58) Field of Classification Search
CPC ...... A01G 9/247; A01G 27/005; A01G 27/00; A01G 31/02; A01G 31/06
See application file for complete search history.

(56) References Cited

U.S. PATENT DOCUMENTS

| 4,545,535 | A | * | 10/1985 | Knapp | .................... | E03C 1/046 |
| | | | | | | 239/313 |
| 5,954,272 | A | * | 9/1999 | Liao | ...................... | B05B 7/2445 |
| | | | | | | 239/581.1 |
| 7,661,604 | B1 | * | 2/2010 | MacLean-Blevins | ........................ | |
| | | | | | | B05B 7/2478 |
| | | | | | | 239/10 |
| 7,703,703 | B2 | * | 4/2010 | Gavin | ................... | B05B 1/1636 |
| | | | | | | 239/521 |
| 10,234,876 | B2 | | 3/2019 | Grossman | | |
| 10,499,574 | B2 | * | 12/2019 | Lu | .......................... | G08B 21/18 |
| 10,973,186 | B2 | * | 4/2021 | Blackburn | ............. | A01G 9/029 |
| 11,083,143 | B2 | * | 8/2021 | Pham | ...................... | A01G 9/022 |
| 2010/0101990 | A1 | * | 4/2010 | Haehn | ....................... | C02F 1/42 |
| | | | | | | 210/258 |
| 2013/0214061 | A1 | * | 8/2013 | Maclean-Blevins | ........................ | |
| | | | | | | B05B 7/2445 |
| | | | | | | 239/310 |
| 2016/0235025 | A1 | * | 8/2016 | Bray | ....................... | A01G 31/06 |
| 2018/0184602 | A1 | * | 7/2018 | Ofir | .......................... | A01G 9/24 |

(Continued)

FOREIGN PATENT DOCUMENTS

| CN | 109753035 A | | 5/2019 | | |
| WO | WO-2020079187 A1 | * | 4/2020 | ............. | A01N 25/00 |

*Primary Examiner* — Monica L Barlow
(74) *Attorney, Agent, or Firm* — Dority & Manning, P.A.

(57) ABSTRACT

An indoor gardening appliance includes a grow module that is rotatably mounted within a grow chamber and that defines pod apertures for receiving a plurality of plant pods. A nutrient cartridge assembly includes a manifold defining a cartridge receptacle for receiving a nutrient cartridge. The manifold defines a follower pin for engaging a track system on the nutrient cartridge such that a user simply pushes the nutrient cartridge into the cartridge receptacle to install the cartridge. When the nutrient cartridge needs to be removed, the user pushes the nutrient cartridge again and the track system/follower pin cause relative rotation between the nutrient cartridge and the follower pin to a circumferential orientation from which it can slide out of the cartridge receptacle.

20 Claims, 17 Drawing Sheets

(56) References Cited

U.S. PATENT DOCUMENTS

| | | |
|---|---|---|
| 2018/0295800 A1 | 10/2018 | Kiernan |
| 2020/0037526 A1* | 2/2020 | Sperry .................. A01G 9/025 |
| 2020/0323157 A1* | 10/2020 | English .................. A01G 7/00 |
| 2021/0084836 A1* | 3/2021 | Hunter .................... A01G 9/16 |
| 2021/0084845 A1* | 3/2021 | Hunter ................ A01G 27/003 |
| 2021/0394210 A1* | 12/2021 | Johnstone ............. B05B 7/2481 |

* cited by examiner

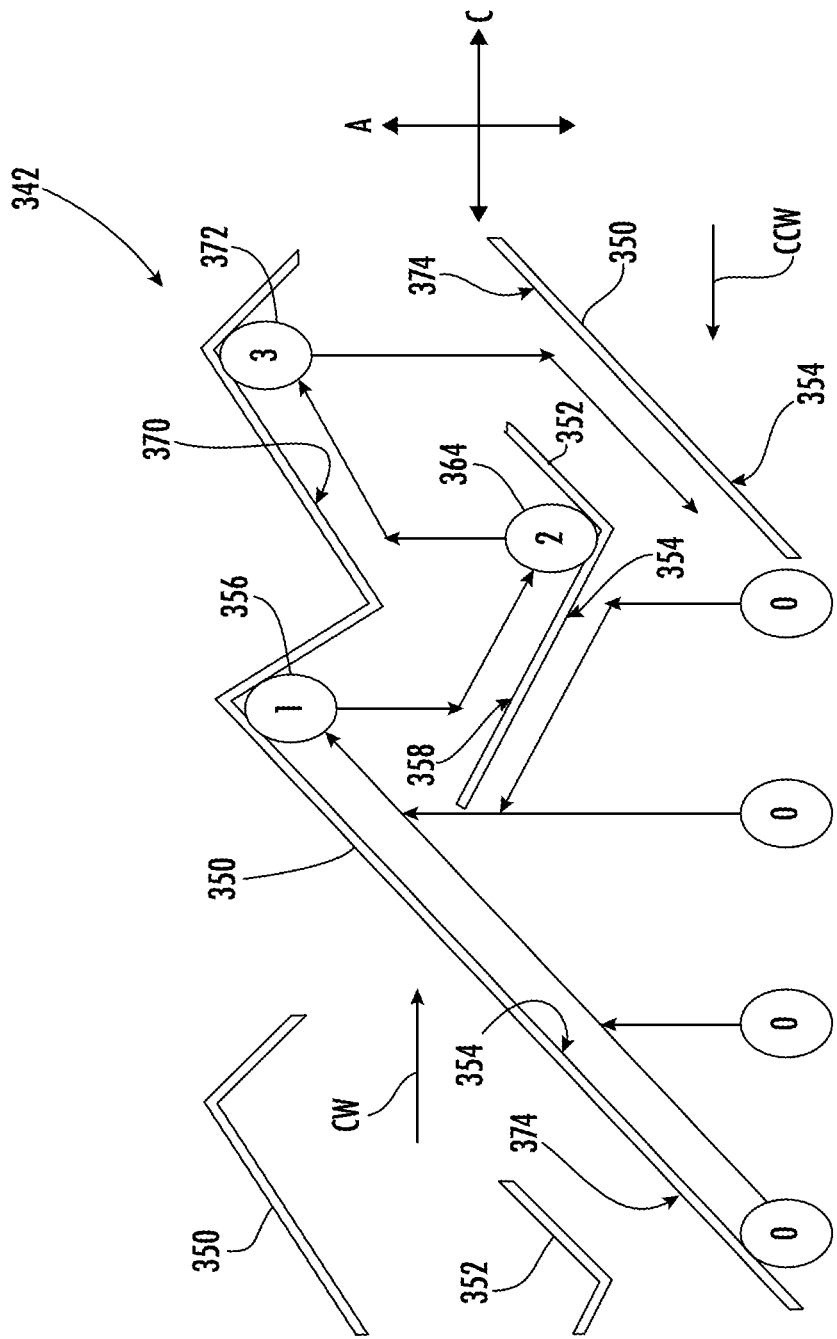

INDOOR GARDEN CENTER WITH A NUTRIENT CARTRIDGE SYSTEM

FIELD OF THE INVENTION

The present subject matter relates generally to systems for gardening plants indoors, and more particularly, to a system for providing nutrients to plants in a garden center.

BACKGROUND OF THE INVENTION

Conventional indoor garden centers include a cabinet defining a grow chamber having a number of trays or racks positioned therein to support seedlings or plant material, e.g., for growing herbs, vegetables, or other plants in an indoor environment. In addition, such indoor garden centers may include an environmental control system that maintains the growing chamber at a desired temperature or humidity. Certain indoor garden centers may also include hydration systems for watering the plants and/or artificial lighting systems that provide the light necessary for such plants to grow.

Conventional hydration systems for indoor gardens centers provide a flow of water and nutrients onto plants stored therein to facilitate plant growth. For example, typical garden centers have a nozzle that sprays water onto roots within a root chamber of a grow module or otherwise charges the root chamber with mist. These hydration systems typically include a mixing tank for mixing one or more concentrated nutrients with water from a municipal water supply or reservoir before discharging the mixture through the nozzle. These hydration systems may include one or more reservoirs that are refillable with concentrated nutrients for facilitating repeated hydration processes. However, refilling or otherwise providing nutrients to these indoor garden centers is often a cumbersome, messy, and time-consuming process.

Accordingly, an improved indoor garden center would be useful. More particularly, an indoor garden center with an improved nutrient dosing system that facilitates quick and easy replenishment of concentrated nutrients would be particularly beneficial.

BRIEF DESCRIPTION OF THE INVENTION

Aspects and advantages of the invention will be set forth in part in the following description, or may be apparent from the description, or may be learned through practice of the invention.

In one exemplary embodiment, a gardening appliance is provided including a liner positioned within a cabinet and defining a grow chamber, a grow module mounted within the liner and defining a pod aperture, the pod aperture being configured for receiving a plant pod, a hydration system including a discharge nozzle for selectively spraying a mist of nutrients into the grow chamber, and a nutrient cartridge assembly for providing nutrients to the hydration system. The nutrient cartridge assembly includes a manifold defining a cartridge receptacle and a follower pin that extends inward to the cartridge receptacle along a radial direction, and a nutrient cartridge including a cylindrical outer surface that defines a track system that protrudes outward along the radial direction, the nutrient cartridge being insertable into the cartridge receptacle along an axial direction such that the track system engages the follower pin to place the nutrient cartridge into a latched position.

In another exemplary embodiment, a nutrient cartridge system for a gardening appliance is provided. The nutrient cartridge system defines an axial direction, a radial direction, and a circumferential direction, The nutrient cartridge system includes a manifold defining a cartridge receptacle and a follower pin that extends inward to the cartridge receptacle along the radial direction and a nutrient cartridge comprising a cylindrical outer surface that defines a track system that protrudes outward along the radial direction, the nutrient cartridge being insertable into the cartridge receptacle along the axial direction such that the track system engages the follower pin to place the nutrient cartridge into a latched position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 17 provides a schematic view of a follower pin of the exemplary nutrient cartridge assembly engaging a track system of the exemplary nutrient cartridge according to an exemplary embodiment of the present subject matter.

Figure 1:
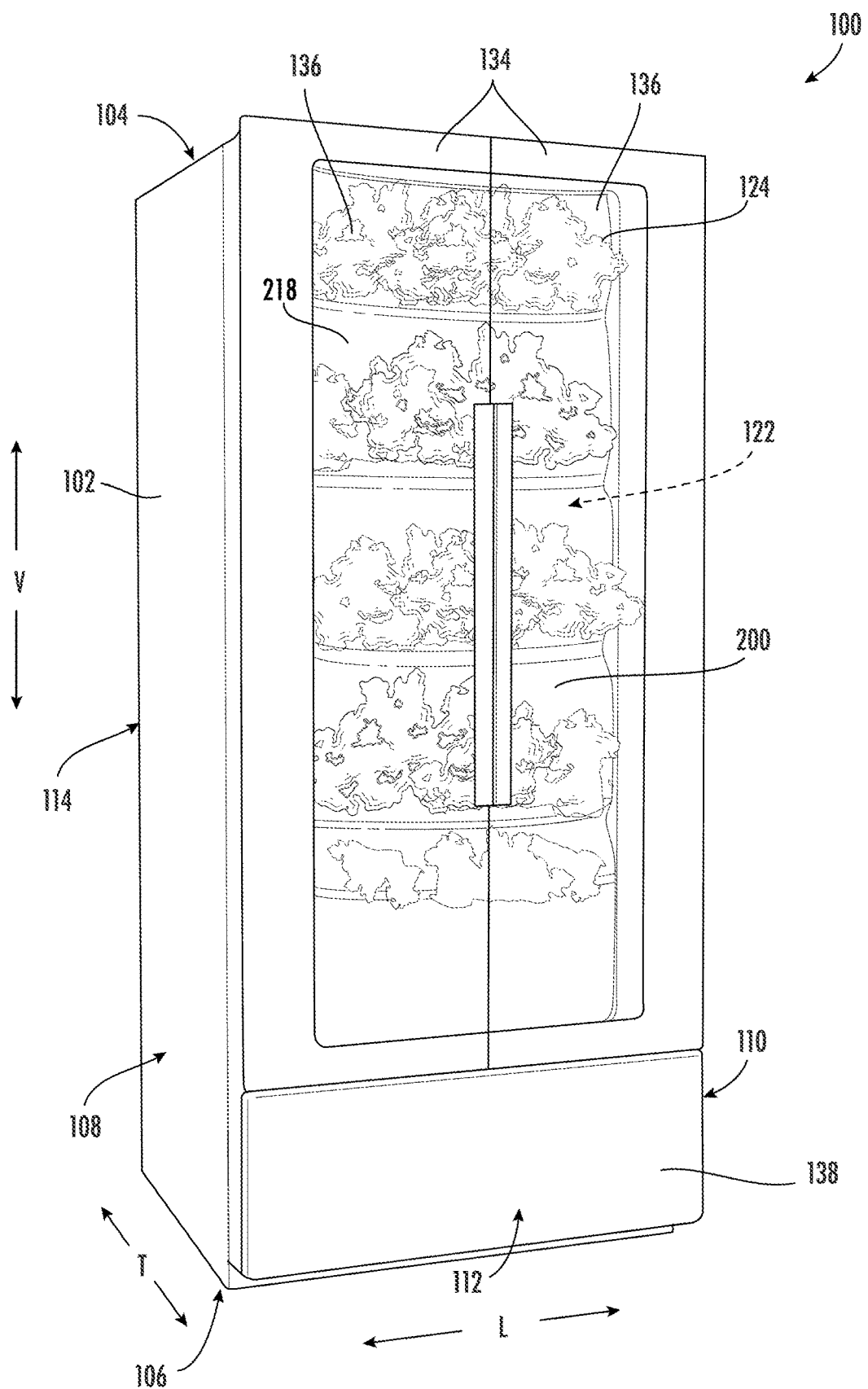
FIG. 1 provides a perspective view of a gardening appliance according to an exemplary embodiment of the present subject matter.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, terms of approximation, such as "approximately," "substantially," or "about," refer to being within a ten percent (10%) margin of error of the stated value. Moreover, as used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

FIG. 1 provides a front view of a gardening appliance 100 according to an exemplary embodiment of the present subject matter. According to exemplary embodiments, gardening appliance 100 may be used as an indoor garden center for growing plants. It should be appreciated that the embodiments described herein are intended only for explaining aspects of the present subject matter. Variations and modifications may be made to gardening appliance 100 while remaining within the scope of the present subject matter.

Gardening appliance 100 includes a housing or cabinet 102 that extends between a top 104 and a bottom 106 along a vertical direction V, between a first side 108 and a second side 110 along a lateral direction L, and between a front side 112 and a rear side 114 along a transverse direction T. Each of the vertical direction V, lateral direction L, and transverse direction T are mutually perpendicular to one another and form an orthogonal direction system.

Gardening appliance 100 may include an insulated liner 120 positioned within cabinet 102. Liner 120 may at least partially define a temperature controlled chamber, referred to herein generally as a grow chamber 122, within which plants 124 may be grown. Although gardening appliance 100 is referred to herein as growing plants 124, it should be appreciated that other organisms or living things may be grown or stored in gardening appliance 100. For example, algae, fungi (e.g., including mushrooms), or other living organisms may be grown or stored in gardening appliance 100. The specific application described herein is not intended to limit the scope of the present subject matter.

Cabinet 102, or more specifically, liner 120 may define a substantially enclosed back region or portion 130. In addition, cabinet 102 and liner 120 may define a front opening, referred to herein as front display opening 132, through which a user of gardening appliance 100 may access grow chamber 122, e.g., for harvesting, planting, pruning, or otherwise interacting with plants 124. According to an exemplary embodiment, enclosed back portion 130 may be defined as a portion of liner 120 that defines grow chamber 122 proximate rear side 114 of cabinet 102. In addition, front display opening 132 may generally be positioned proximate or coincide with front side 112 of cabinet 102.

Figure 2:
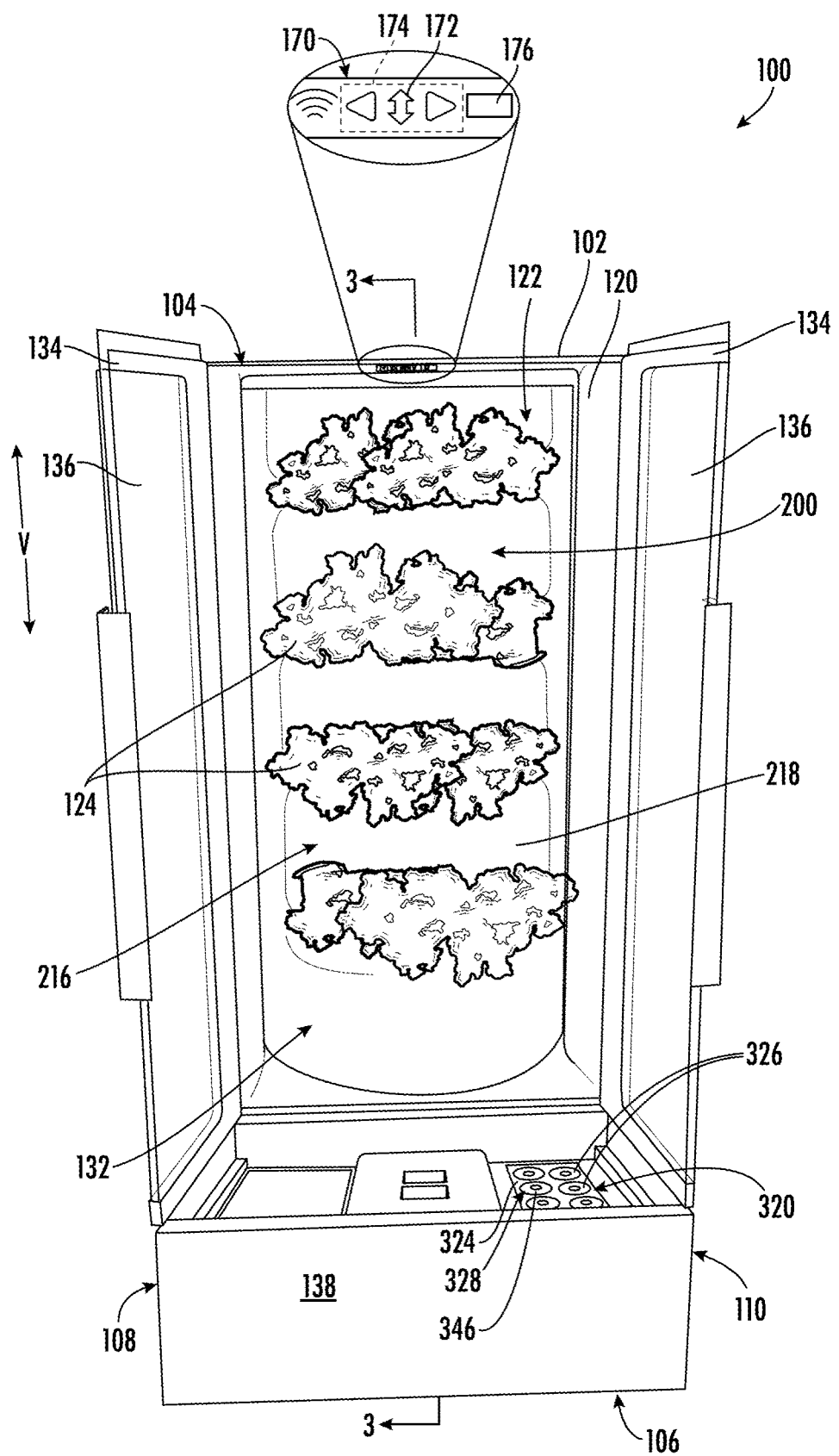
FIG. 2 depicts a front view of the exemplary gardening appliance of FIG. 1 with the doors open according to an exemplary embodiment of the present subject matter.

Gardening appliance 100 may further include one or more doors 134 that are rotatably mounted to cabinet 102 for providing selective access to grow chamber 122. For example, FIG. 1 illustrates doors 134 in the closed position such that they may help insulate grow chamber 122. By contrast, FIG. 2 illustrates doors 134 in the open positioned for accessing grow chamber 122 and plants 124 stored therein. Doors 134 may further include a transparent window 136 through which a user may observe plants 124 without opening doors 134.

Although doors 134 are illustrated as being rectangular and being mounted on front side 112 of cabinet 102 in FIGS. 1 and 2, it should be appreciated that according to alternative embodiments, doors 134 may have different shapes, mounting locations, etc. For example, doors 134 may be curved, may be formed entirely from glass, etc. In addition, doors 134 may have integral features for controlling light passing into and/or out of grow chamber 122, such as internal louvers, tinting, UV treatments, polarization, etc. One skilled in the art will appreciate that other chamber and door configurations are possible and within the scope of the present invention.

According to the illustrated embodiment, cabinet 102 further defines a drawer 138 positioned proximate bottom 106 of cabinet 102 and being slidably mounted to cabinet for providing convenient storage for plant nutrients, system accessories, water filters, etc. In addition, behind drawer 138 is a mechanical compartment 140 for receipt of an environmental control system including a sealed system for regulating the temperature within grow chamber 122, as described in more detail below.

Figure 3:
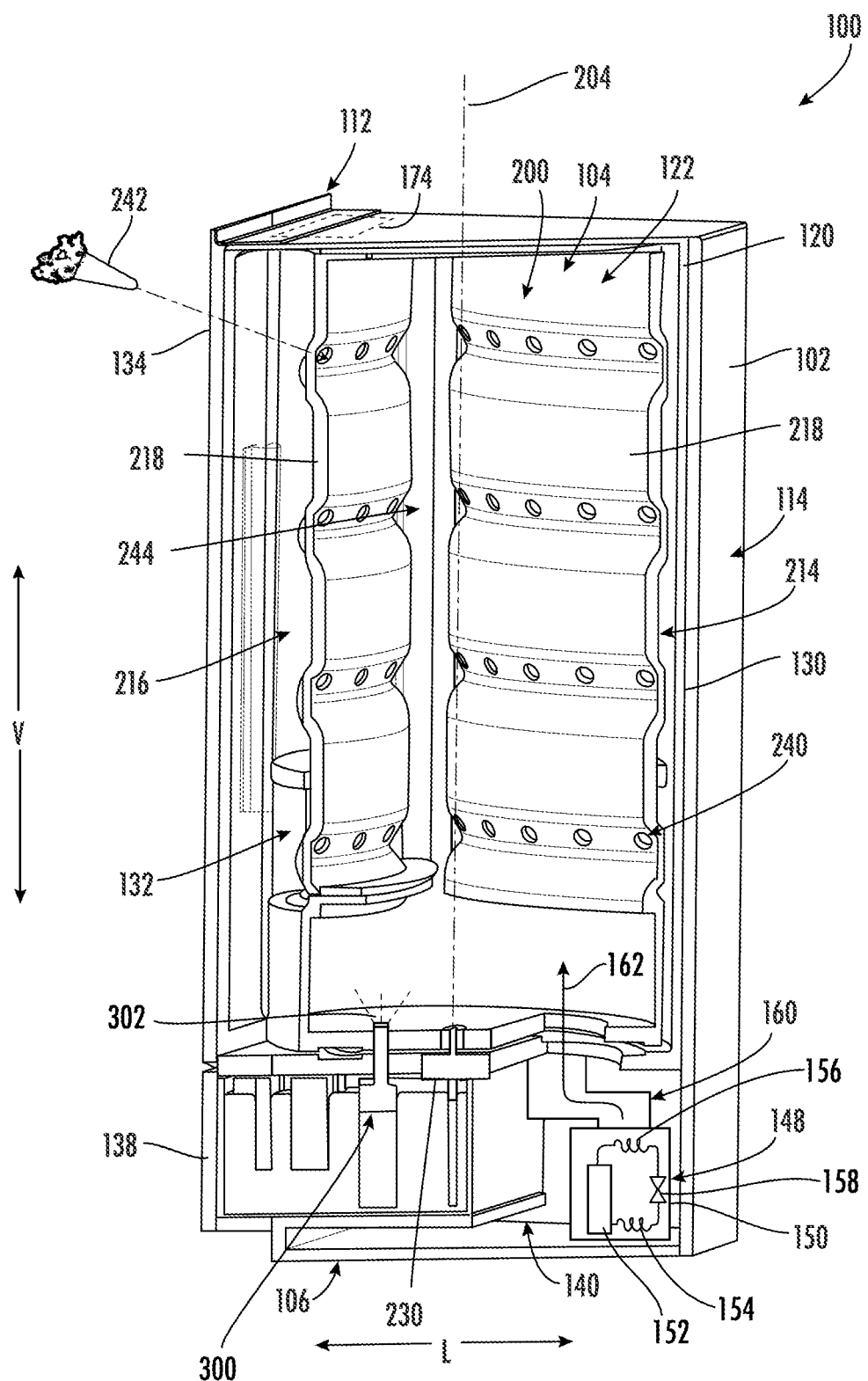
FIG. 3 is a cross sectional view of the exemplary gardening appliance of FIG. 1, taken along Line 3-3 from FIG. 2 with an internal divider removed for clarity.

FIG. 3 provides a schematic view of certain components of an environmental control system 148 that may be used to regulate a temperature within grow chamber 122. Specifically, environmental control system 148 may include a sealed system 150, a duct system 160, and a hydration system 300, or any other suitable components or subsystems for regulating an environment within grow chamber 122, e.g., for facilitating improved or regulated growth of plants 124 positioned therein. Specifically, FIG. 3 illustrates sealed system 150 within mechanical compartment 140. Although an exemplary sealed system is illustrated and described herein, it should be appreciated that variations and modifications may be made to sealed system 150 while remaining within the scope of the present subject matter. For example, sealed system 150 may include additional or alternative components, different ducting configurations, etc.

As shown, sealed system 150 includes a compressor 152, a first heat exchanger or evaporator 154 and a second heat exchanger or condenser 156. As is generally understood, compressor 152 is generally operable to circulate or urge a flow of refrigerant through sealed system 150, which may include various conduits which may be utilized to flow refrigerant between the various components of sealed system 150. Thus, evaporator 154 and condenser 156 may be between and in fluid communication with each other and compressor 152.

During operation of sealed system 150, refrigerant flows from evaporator 154 and to compressor 152, and compressor 152 is generally configured to direct compressed refrigerant from compressor 152 to condenser 156. For example, refrigerant may exit evaporator 154 as a fluid in the form of a superheated vapor. Upon exiting evaporator 154, the refrigerant may enter compressor 152, which is operable to compress the refrigerant. Accordingly, the pressure and temperature of the refrigerant may be increased in compressor 152 such that the refrigerant becomes a more superheated vapor.

Condenser 156 is disposed downstream of compressor 152 and is operable to reject heat from the refrigerant. For example, the superheated vapor from compressor 152 may enter condenser 156 and transfer energy to air surrounding condenser 156 (e.g., to create a flow of heated air). In this manner, the refrigerant condenses into a saturated liquid and/or liquid vapor mixture. A condenser fan (not shown) may be positioned adjacent condenser 156 and may facilitate or urge the flow of heated air across the coils of condenser 156 (e.g., from ambient atmosphere) in order to facilitate heat transfer.

According to the illustrated embodiment, an expansion device or a variable electronic expansion valve 158 may be further provided to regulate refrigerant expansion. During use, variable electronic expansion valve 158 may generally expand the refrigerant, lowering the pressure and temperature thereof. In this regard, refrigerant may exit condenser 156 in the form of high liquid quality/saturated liquid vapor mixture and travel through variable electronic expansion valve 158 before flowing through evaporator 154. Variable electronic expansion valve 158 is generally configured to be adjustable, e.g., such that the flow of refrigerant (e.g., volumetric flow rate in milliliters per second) through variable electronic expansion valve 158 may be selectively varied or adjusted.

Evaporator 154 is disposed downstream of variable electronic expansion valve 158 and is operable to heat refrigerant within evaporator 154, e.g., by absorbing thermal energy from air surrounding the evaporator (e.g., to create a flow of cooled air). For example, the liquid or liquid vapor mixture refrigerant from variable electronic expansion valve 158 may enter evaporator 154. Within evaporator 154, the refrigerant from variable electronic expansion valve 158 receives energy from the flow of cooled air and vaporizes into superheated vapor and/or high quality vapor mixture. An air handler or evaporator fan (not shown) is positioned adjacent evaporator 154 and may facilitate or urge the flow of cooled air across evaporator 154 in order to facilitate heat transfer. From evaporator 154, refrigerant may return to compressor 152 and the vapor-compression cycle may continue.

As explained above, environmental control system 148 includes a sealed system 150 for providing a flow of heated air or a flow cooled air throughout grow chamber 122 as needed. To direct this air, environmental control system 148 includes a duct system 160 for directing the flow of temperature regulated air, identified herein simply as flow of air 162 (see, e.g., FIG. 3). In this regard, for example, an evaporator fan can generate a flow of cooled air as the air passes over evaporator 154 and a condenser fan can generate a flow of heated air as the air passes over condenser 156.

These flows of air 162 are routed through a cooled air supply duct and/or a heated air supply duct (not shown), respectively. In this regard, it should be appreciated that environmental control system 148 may generally include a plurality of ducts, dampers, diverter assemblies, and/or air handlers to facilitate operation in a cooling mode, in a heating mode, in both a heating and cooling mode, or any other mode suitable for regulating the environment within grow chamber 122. It should be appreciated that duct system 160 may vary in complexity and may regulate the flows of air from sealed system 150 in any suitable arrangement through any suitable portion of grow chamber 122.

Gardening appliance 100 may include a control panel 170. Control panel 170 includes one or more input selectors 172, such as e.g., knobs, buttons, push buttons, touchscreen interfaces, etc. In addition, input selectors 172 may be used to specify or set various settings of gardening appliance 100, such as e.g., settings associated with operation of sealed system 150. Input selectors 172 may be in communication with a processing device or controller 174. Control signals generated in or by controller 174 operate gardening appliance 100 in response to input selectors 172. Additionally, control panel 170 may include a display 176, such as an indicator light or a screen. Display 176 is communicatively coupled with controller 174 and may display information in response to signals from controller 174. Further, as will be described herein, controller 174 may be communicatively coupled with other components of gardening appliance 100, such as e.g., one or more sensors, motors, or other components.

As used herein, "processing device" or "controller" may refer to one or more microprocessors or semiconductor devices and is not restricted necessarily to a single element. The processing device can be programmed to operate gardening appliance 100. The processing device may include, or be associated with, one or more memory elements (e.g., non-transitory storage media). In some such embodiments, the memory elements include electrically erasable, programmable read only memory (EEPROM). Generally, the memory elements can store information accessible processing device, including instructions that can be executed by processing device. Optionally, the instructions can be software or any set of instructions and/or data that when executed by the processing device, cause the processing device to perform operations.

Referring now generally to FIGS. 1 through 8, gardening appliance 100 generally includes a rotatable carousel, referred to herein as a grow module 200 that is mounted within liner 120, e.g., such that it is within grow chamber 122. As illustrated, grow module 200 includes a central hub 202 that extends along and is rotatable about a central axis 204. Specifically, according to the illustrated embodiment, central axis 204 is parallel to the vertical direction V. However, it should be appreciated that central axis 204 could alternatively extend in any suitable direction, e.g., such as the horizontal direction. In this regard, grow module 200 generally defines an axial direction, i.e., parallel to central axis 204, a radial direction R that extends perpendicular to central axis 204, and a circumferential direction C that extends around central axis 204 (e.g. in a plane perpendicular to central axis 204).

Grow module 200 may further include a plurality of partitions 206 that extend from central hub 202 substantially along the radial direction R. In this manner, grow module 200 defines a plurality of chambers, referred to herein generally by reference numeral 210, by dividing or partitioning grow chamber 122. Referring specifically to a first embodiment of grow module 200 illustrated in FIGS. 1 through 8, grow module 200 includes three partitions 206 to define a first chamber 212, a second chamber 214, and a third chamber 216, which are circumferentially spaced relative to each other. In general, as grow module 200 is rotated within grow chamber 122, the plurality of chambers 210 define substantially separate and distinct growing environments, e.g., for growing plants 124 having different growth needs.

More specifically, partitions 206 may extend from central hub 202 to a location immediately adjacent liner 120. Although partitions 206 are described as extending along the radial direction, it should be appreciated that they need not be entirely radially extending. For example, according to the illustrated embodiment, the distal ends of each partition is joined with an adjacent partition using an arcuate wall 218, which is generally used to support plants 124.

Notably, it is desirable according to exemplary embodiments to form a substantial seal between partitions 206 and liner 120. Therefore, according to an exemplary embodiment, grow module 200 may define a grow module diameter 220 (e.g., defined by its substantially circular footprint formed in a horizontal plane). Similarly, enclosed back portion 130 of liner 120 may be substantially cylindrical and may define a liner diameter 222. In order to prevent a significant amount of air from escaping between partitions 206 and liner 120, liner diameter 222 may be substantially equal to or slightly larger than grow module diameter 220.

Referring now specifically to FIG. 3, gardening appliance 100 may further include a motor 230 or another suitable driving element or device for selectively rotating grow module 200 during operation of gardening appliance 100. In this regard, according to the illustrated embodiment, motor 230 is positioned below grow module 200, e.g., within mechanical compartment 140, and is operably coupled to grow module 200 along central axis 204 for rotating grow module 200.

As used herein, "motor" may refer to any suitable drive motor and/or transmission assembly for rotating grow module 200. For example, motor 230 may be a brushless DC electric motor, a stepper motor, or any other suitable type or configuration of motor. For example, motor 230 may be an AC motor, an induction motor, a permanent magnet synchronous motor, or any other suitable type of AC motor. In addition, motor 230 may include any suitable transmission assemblies, clutch mechanisms, or other components.

According to an exemplary embodiment, motor 230 may be operably coupled to controller 174, which is programmed to rotate grow module 200 according to predetermined operating cycles, based on user inputs (e.g. via touch buttons 172), etc. In addition, controller 174 may be communicatively coupled to one or more sensors, such as temperature or humidity sensors, positioned within the various chambers 210 for measuring temperatures and/or humidity, respectively. Controller 174 may then operate motor 230 in order to maintain desired environmental conditions for each of the respective chambers 210. For example, as will be described in more detail below, gardening appliance 100 includes features for providing certain locations of gardening appliance 100 with light, temperature control, proper moisture, nutrients, and other requirements for suitable plant growth. Motor 230 may be used to position specific chambers 210 where needed to receive such growth requirements.

According to an exemplary embodiment, such as where three partitions 206 form three chambers 212-216, controller 174 may operate motor 230 to index grow module 200 sequentially through a number of preselected positions. More specifically, motor 230 may rotate grow module 200 in a counterclockwise direction (e.g. when viewed from a top of grow module 200) in 120° increments to move chambers 210 between sealed positions and display positions. As used herein, a chamber 210 is considered to be in a "sealed position" when that chamber 210 is substantially sealed between grow module 200 (i.e., central hub 202 and adjacent partitions 206) and liner 120. By contrast, a chamber 210 is considered to be in a "display position" when that chamber 210 is at least partially exposed to front display opening 132, such that a user may access plants 124 positioned within that chamber 210.

Figure 4:
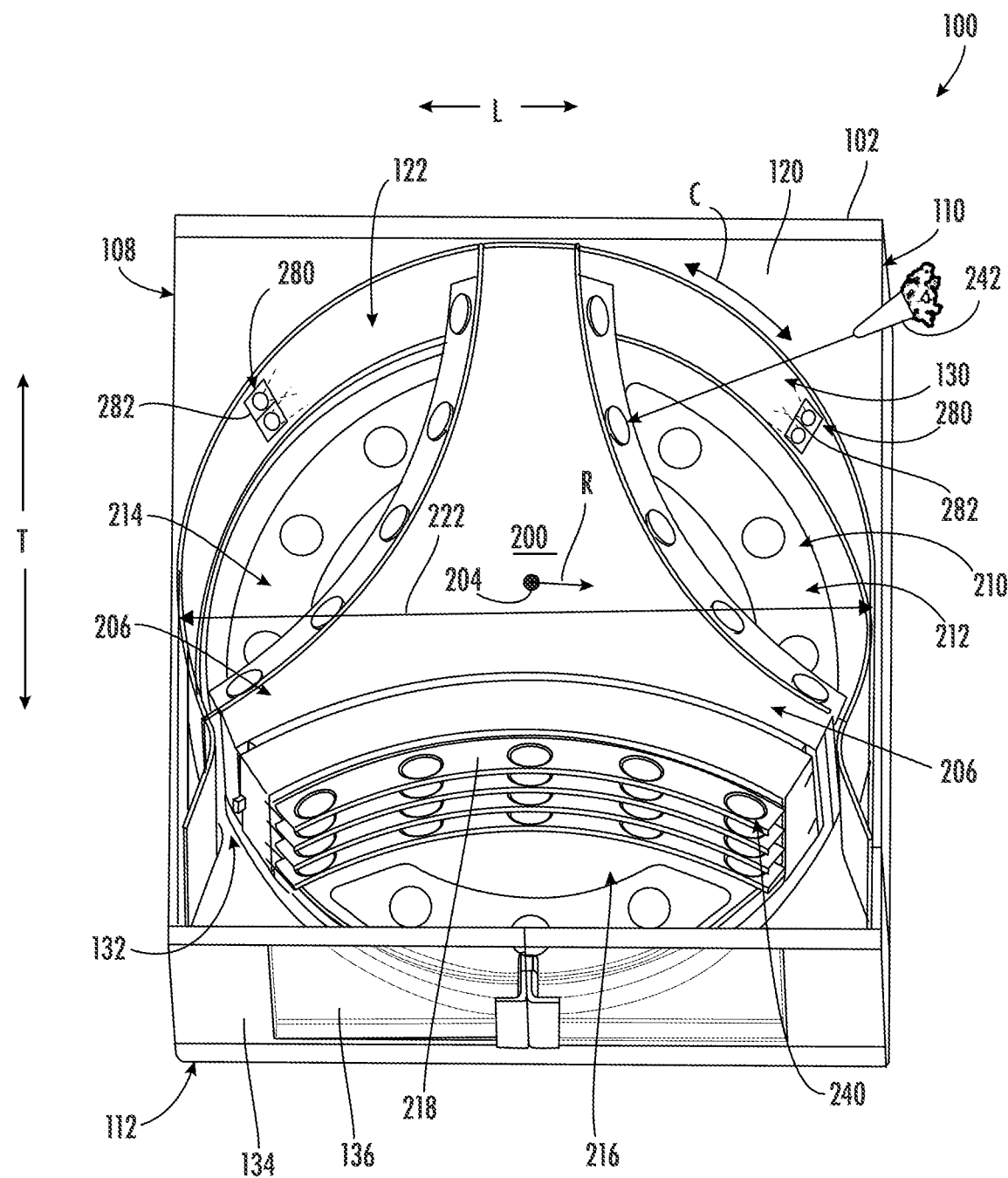
FIG. 4 is a top perspective view of the exemplary gardening appliance of FIG. 1, with the top panel of the cabinet removed to reveal a rotatable grow module according to an exemplary embodiment of the present subject matter.
Figure 5:
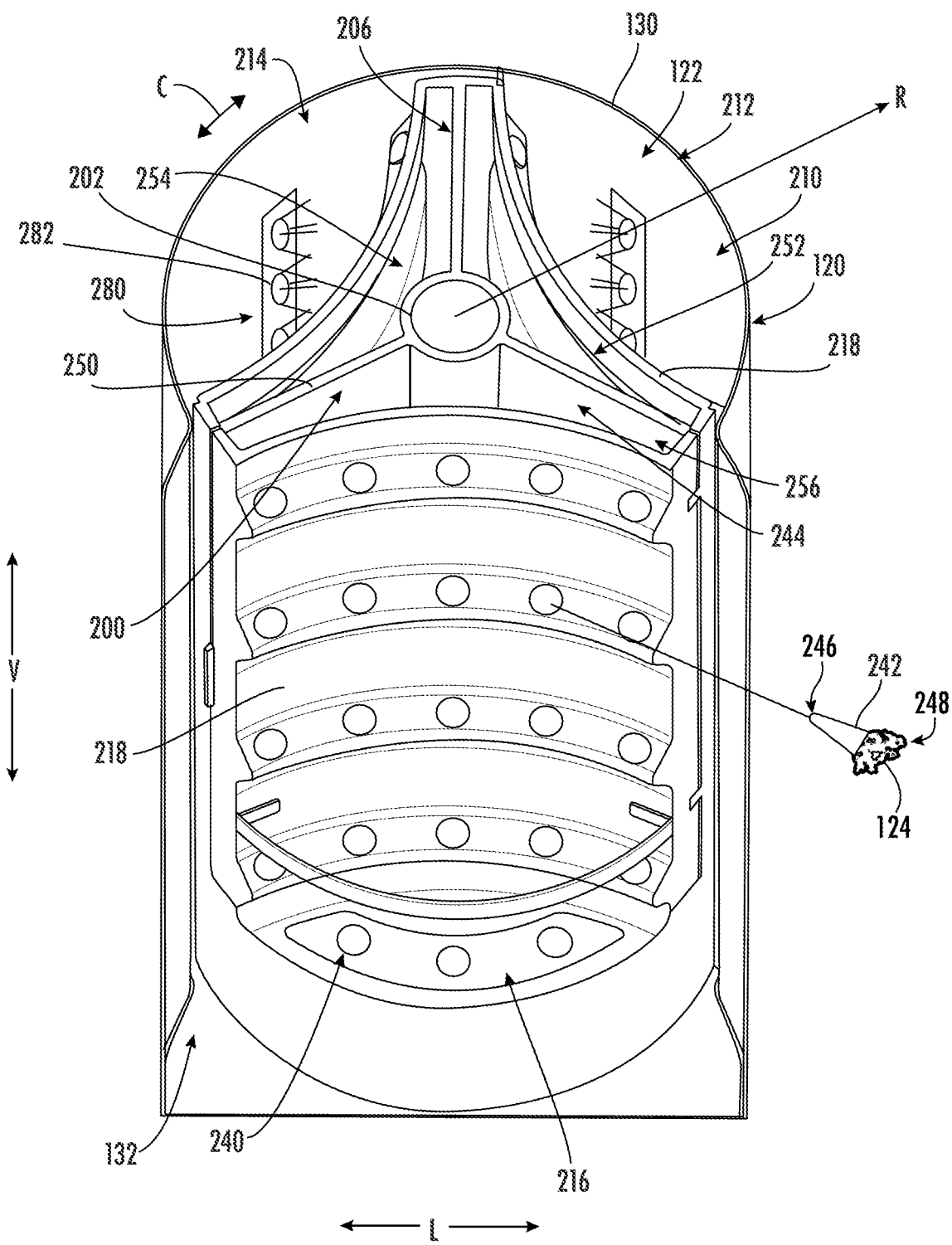
FIG. 5 provides a perspective cross sectional view of the exemplary gardening appliance of FIG. 1 according to another exemplary embodiment of the present subject matter.
Figure 6:
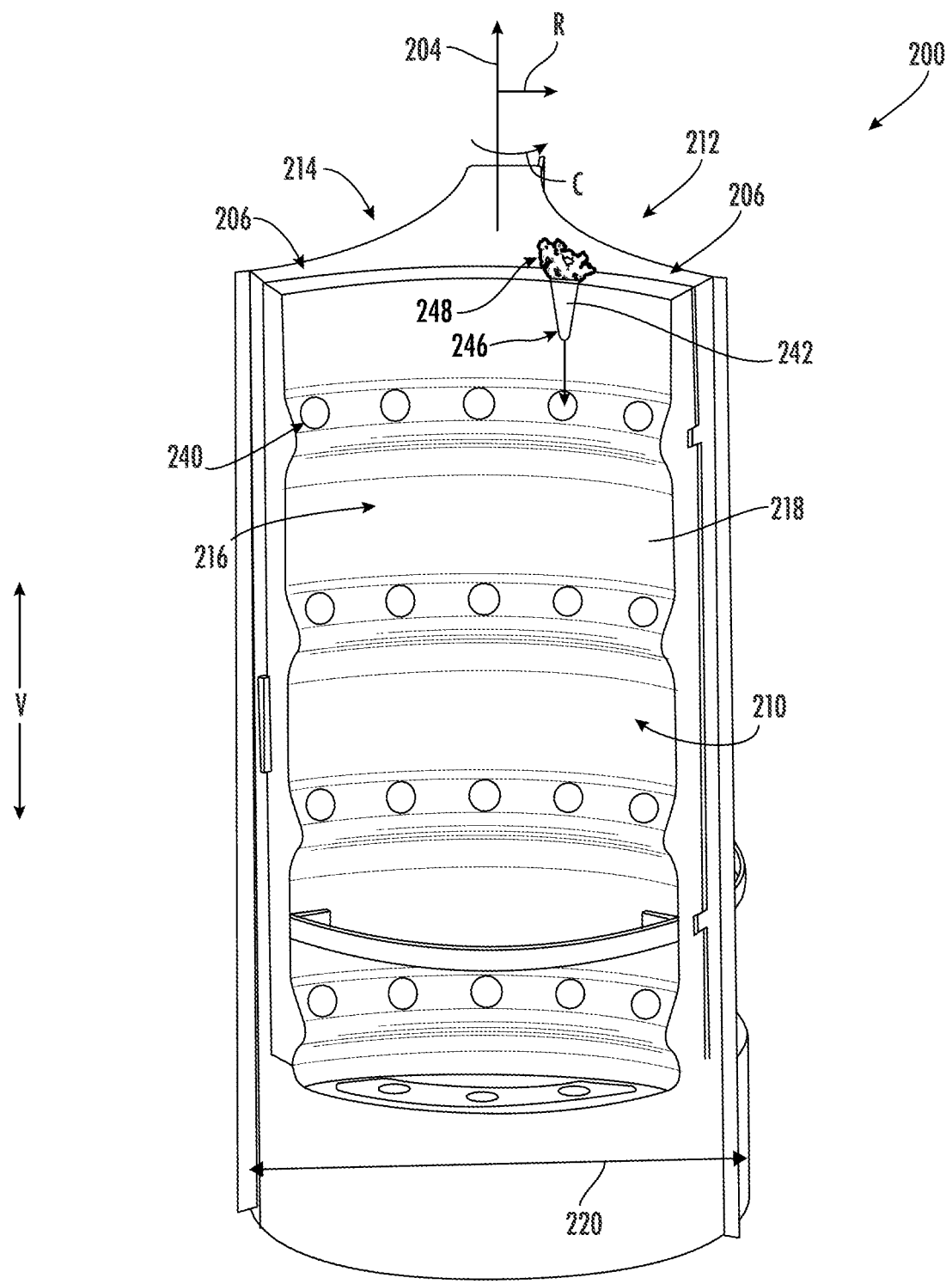
FIG. 6 provides a perspective view of the grow module of the exemplary gardening appliance of FIG. 1 according to another exemplary embodiment of the present subject matter.

For example, as illustrated in FIGS. 4 and 5, first chamber 212 and second chamber 214 are both in a sealed position, whereas third chamber 216 is in a display position. As motor 230 rotates grow module 200 by 120 degrees in the counterclockwise direction, second chamber 214 will enter the display position, while first chamber 212 and third chamber 216 will be in the sealed positions. Motor 230 may continue to rotate grow module 200 in such increments to cycle grow chambers 210 between these sealed and display positions.

Referring now generally to FIGS. 4 through 8, grow module 200 will be described in more detail according to an exemplary embodiment of the present subject matter. As shown, grow module 200 defines a plurality of apertures 240 which are generally configured for receiving plant pods 242 into an internal root chamber 244. Plant pods 242 generally contain seedlings or other material for growing plants positioned within a mesh or other support structure through which roots of plants 124 may grow within grow module 200. A user may insert a portion of plant pod 242 (e.g., a seed end or root end 246) having the desired seeds through one of the plurality of apertures 240 into root chamber 244. A plant end 248 of the plant pod 242 may remain within grow chamber 210 such that plants 124 may grow from grow module 200 such that they are accessible by a user. In this regard, grow module 200 defines root chamber 244, e.g., within at least one of central hub 202 and the plurality of partitions 206. As will be explained below, water and other nutrients may be supplied to the root end 246 of plant pods 242 within root chamber 244. Notably, apertures 240 may be covered by a flat flapper seal (not shown) to prevent water from escaping root chamber 244 when no plant pod 242 is installed.

Figure 7:
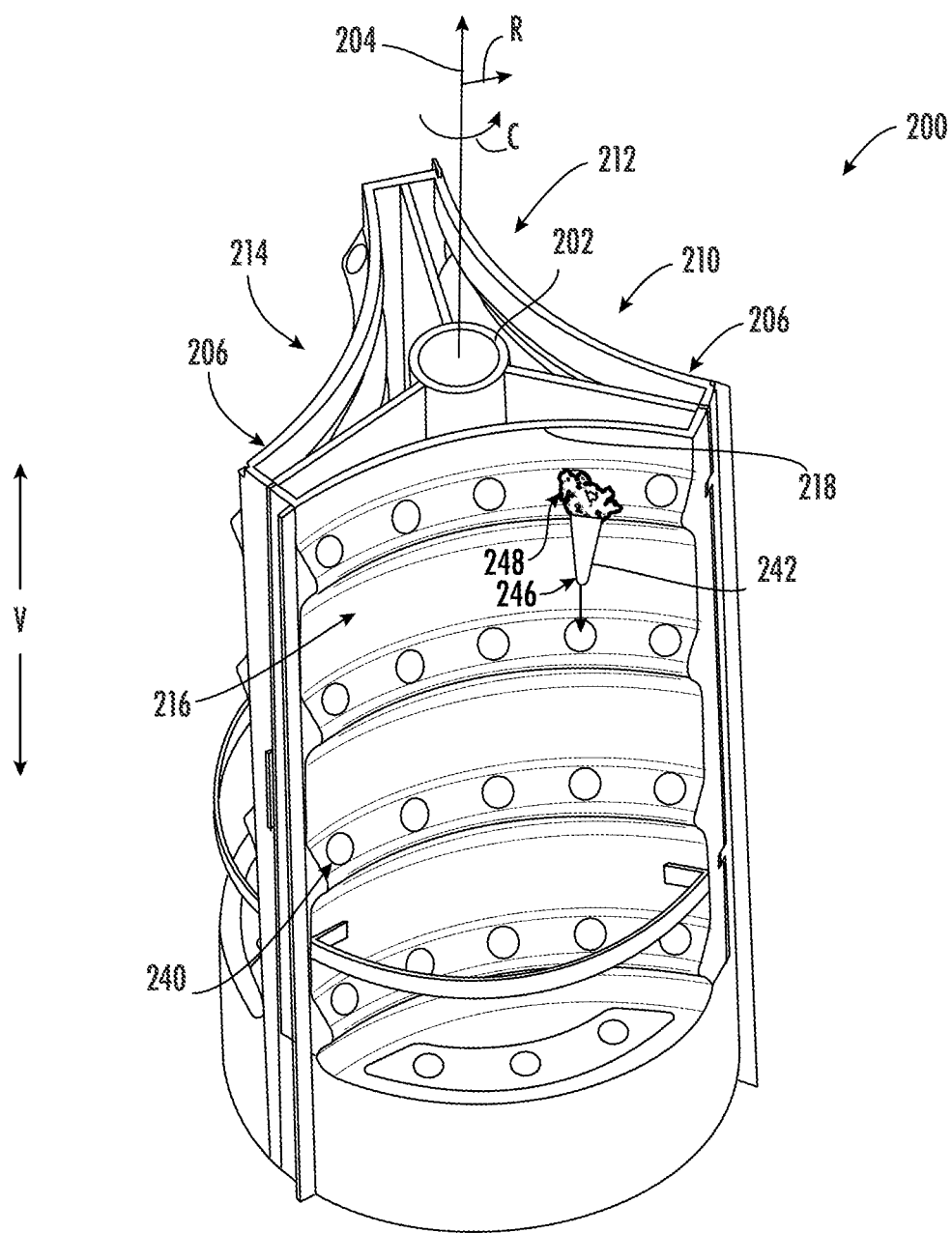
FIG. 7 provides a perspective cross sectional view of the exemplary grow module of FIG. 6 according to another exemplary embodiment of the present subject matter.
Figure 8:
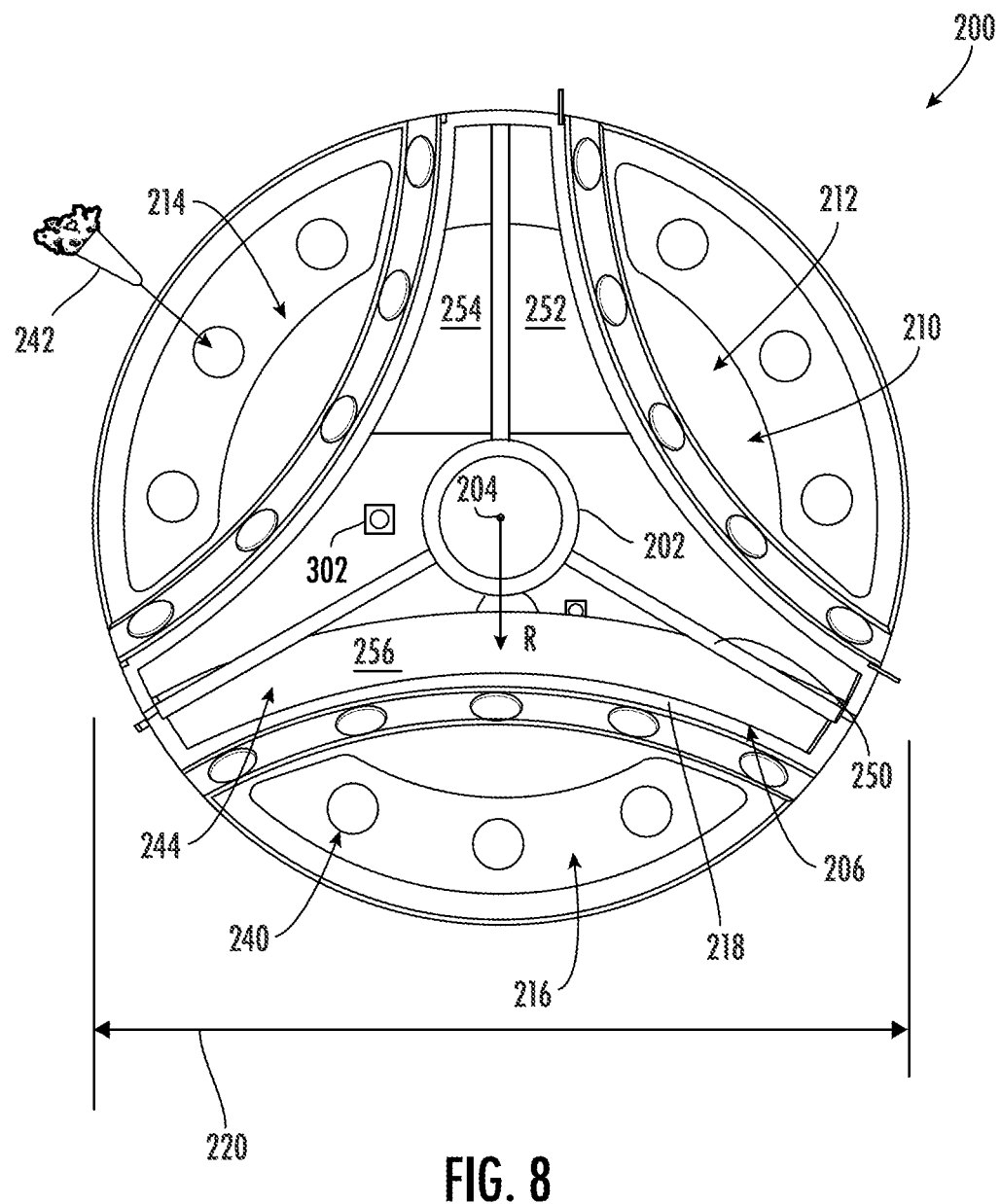
FIG. 8 provides a top cross-sectional view of the exemplary grow module of FIG. 6 according to another exemplary embodiment of the present subject matter.
Figure 9:
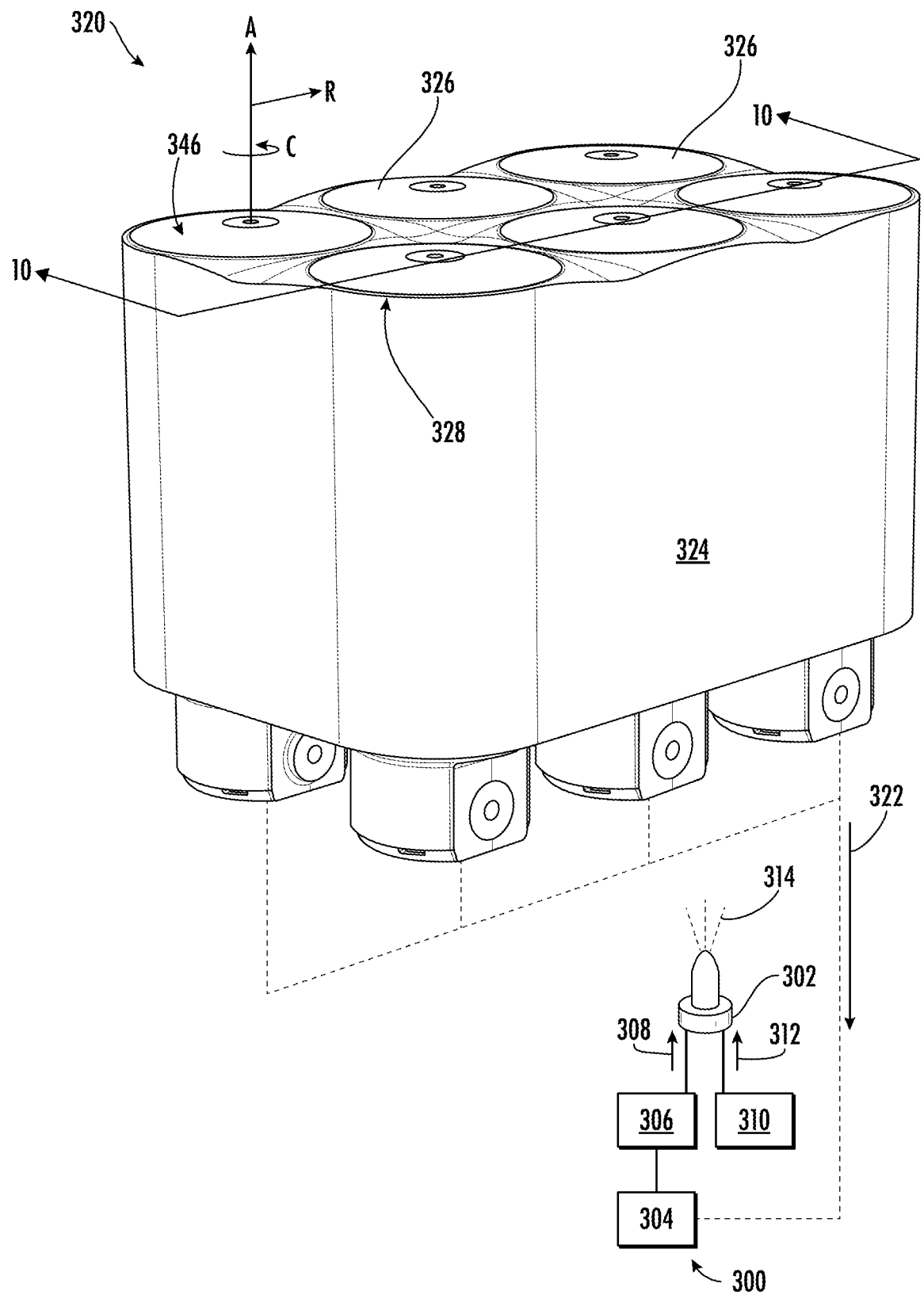
FIG. 9 provides a perspective view of a nutrient cartridge assembly that may be used with the exemplary gardening appliance of FIG. 1 according to an exemplary embodiment of the present subject matter.
Figure 10:
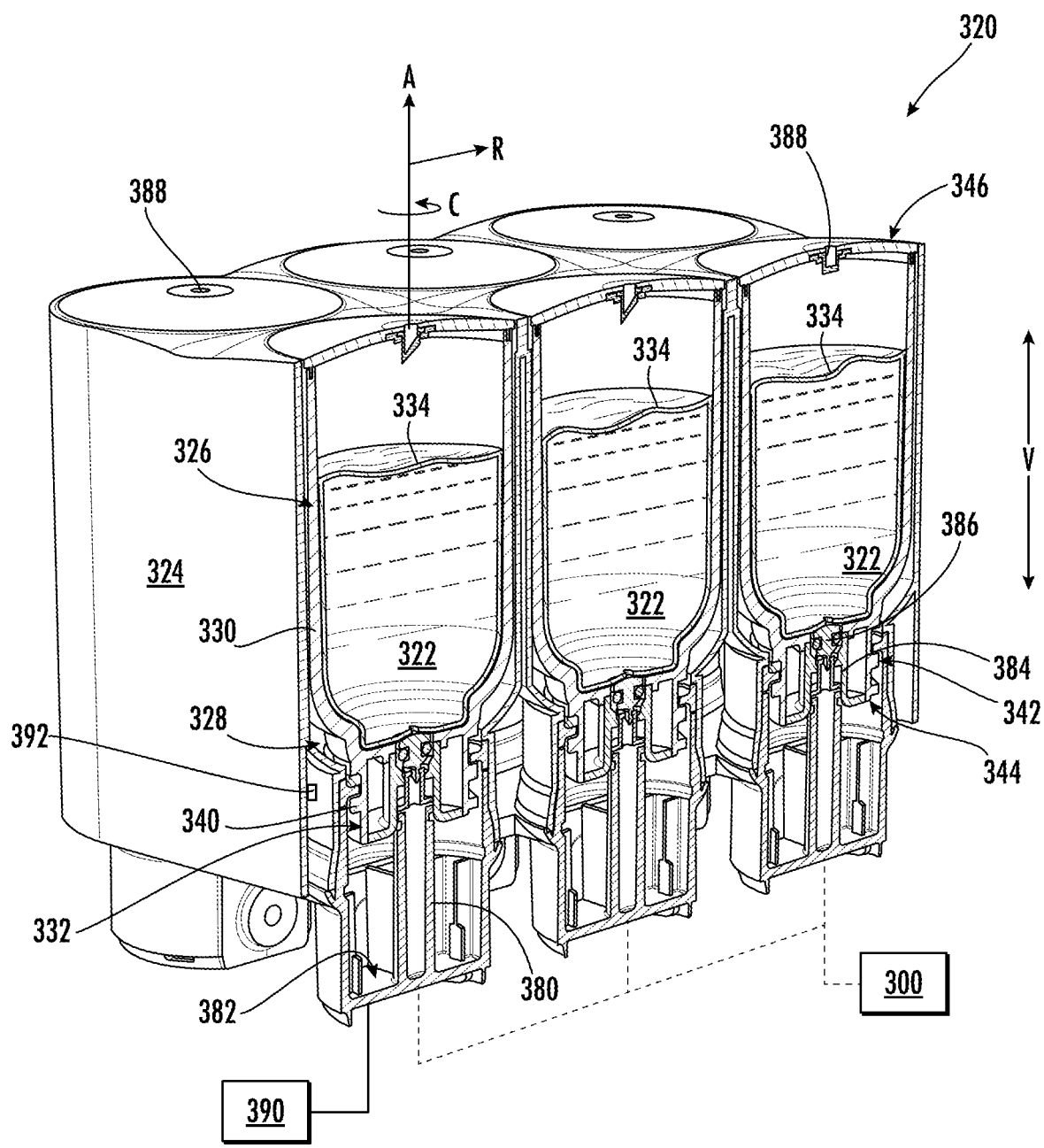
FIG. 10 provides a cross sectional view of the exemplary nutrient cartridge assembly, taken along Line 10-10 from FIG. 9.
Figure 11:
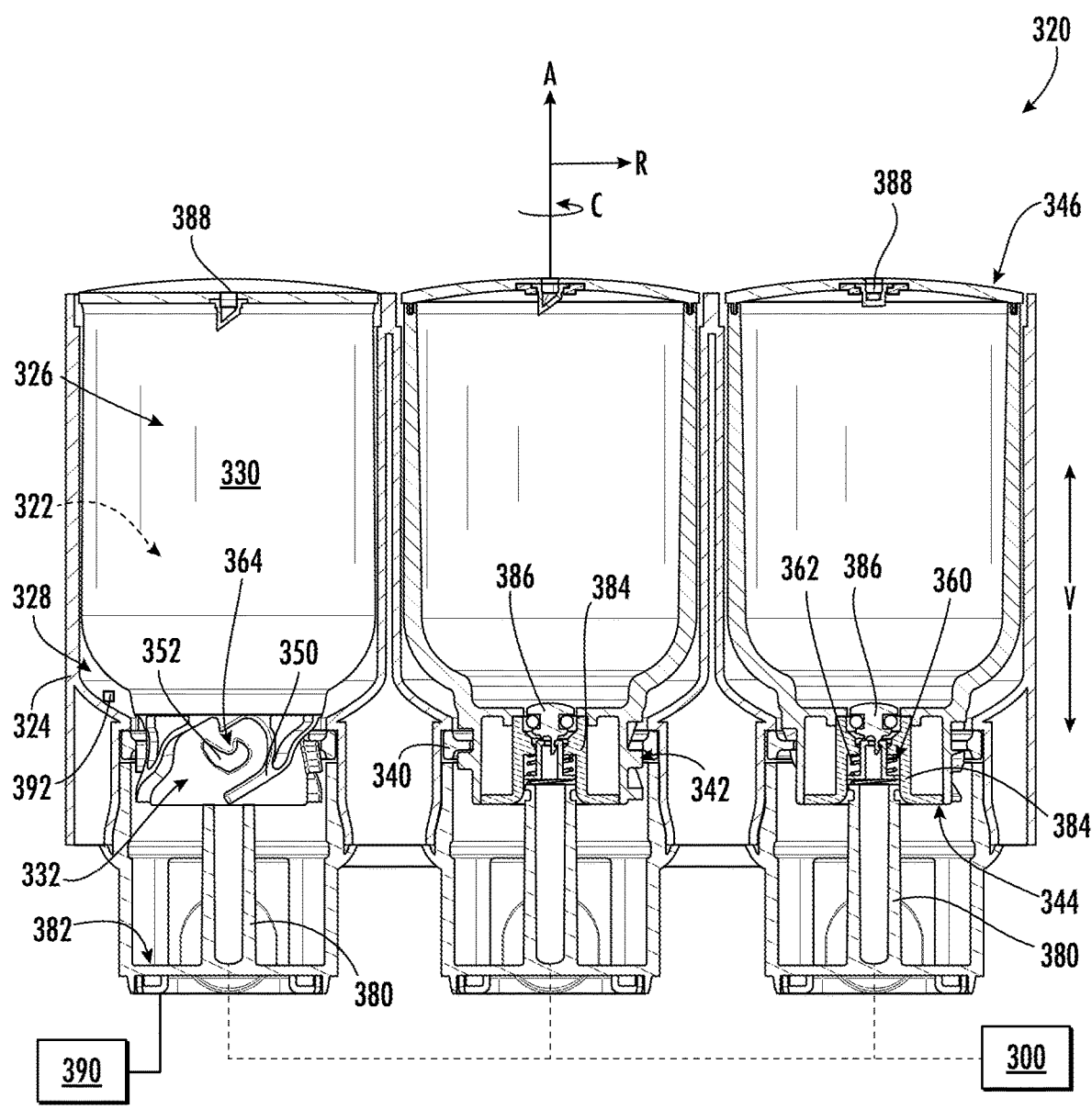
FIG. 11 provides another cross sectional view of the exemplary nutrient cartridge assembly of FIG. 9 according to an exemplary embodiment of the present subject matter.
Figure 12:
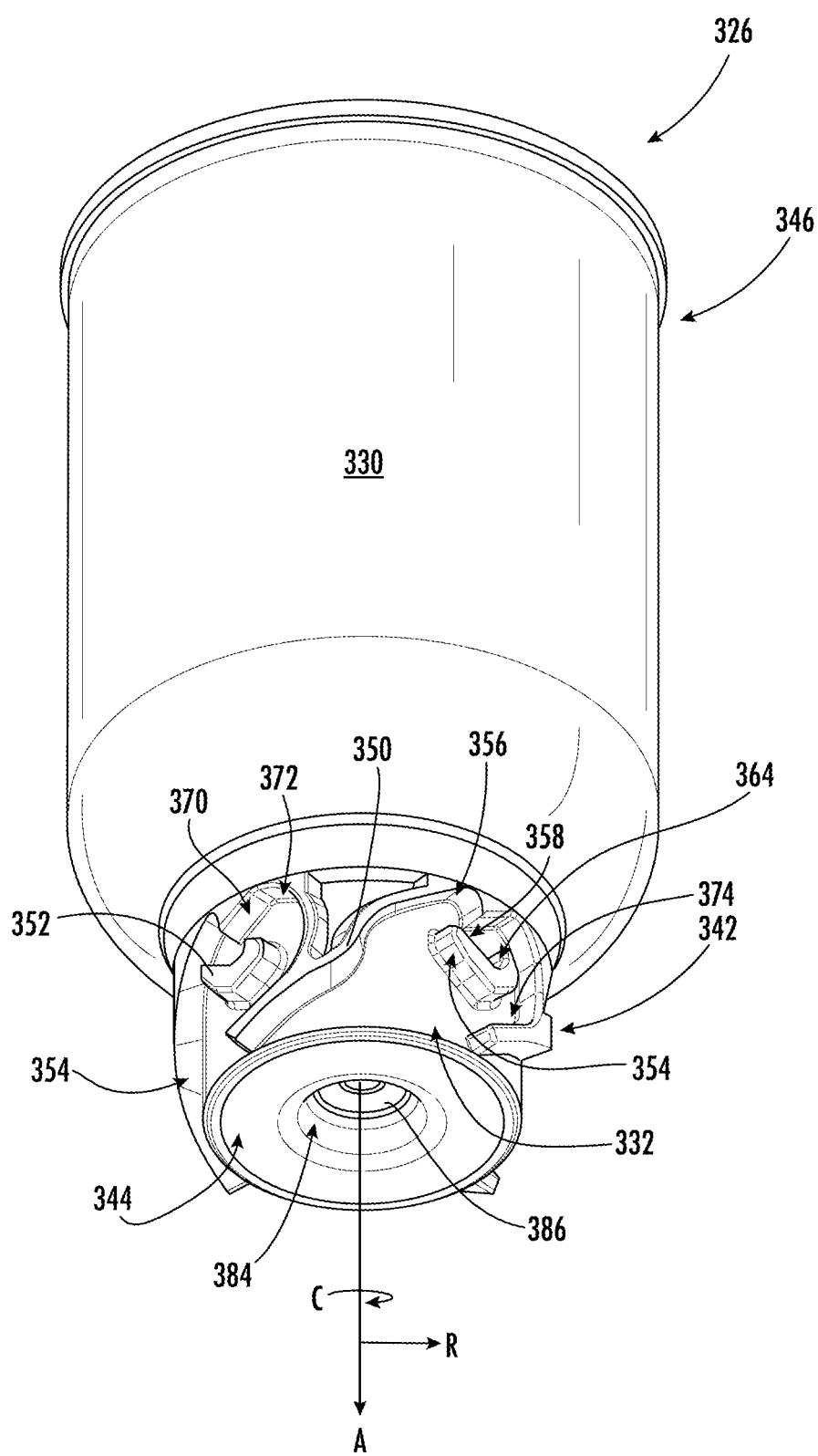
FIG. 12 provides a perspective view of a nutrient cartridge that may be used with the exemplary nutrient cartridge assembly of FIG. 9 according to an exemplary embodiment of the present subject matter.
Figure 13:
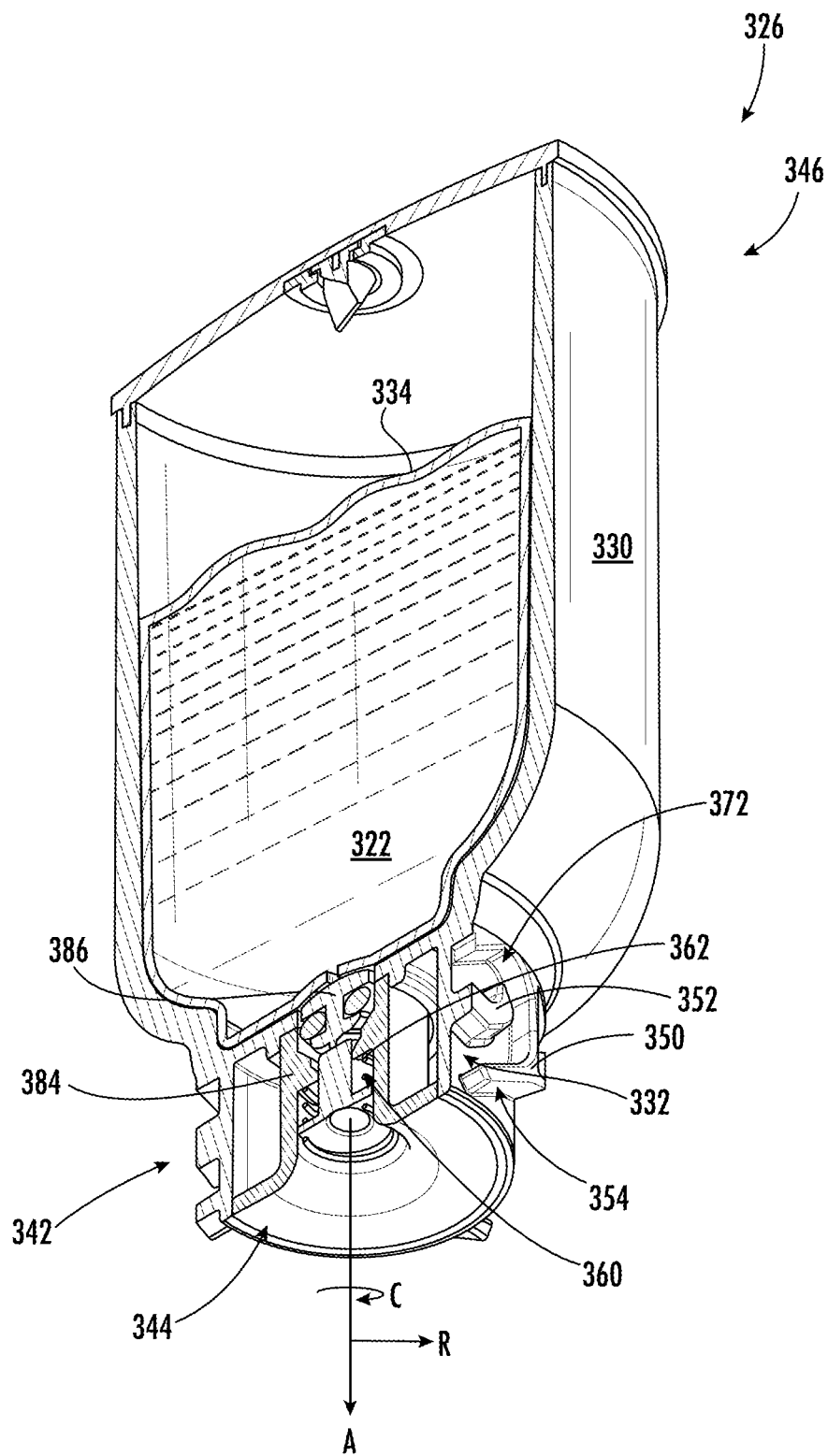
FIG. 13 provides a cross sectional view of the exemplary nutrient cartridge of FIG. 12 according to an exemplary embodiment of the present subject matter.
Figure 14:
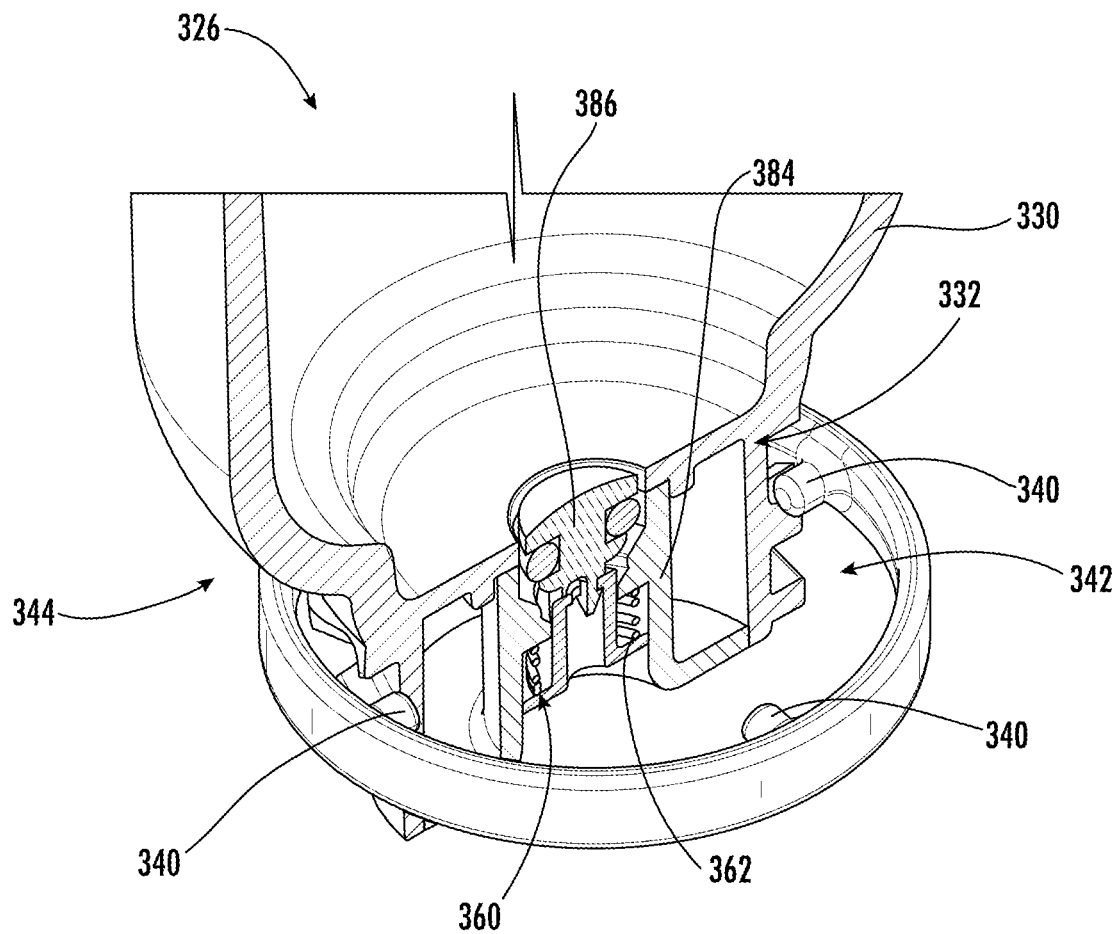
FIG. 14 provides a partial perspective view of the exemplary nutrient cartridge of FIG. 12 engaging the exemplary nutrient cartridge assembly according to an exemplary embodiment of the present subject matter.
Figure 15:
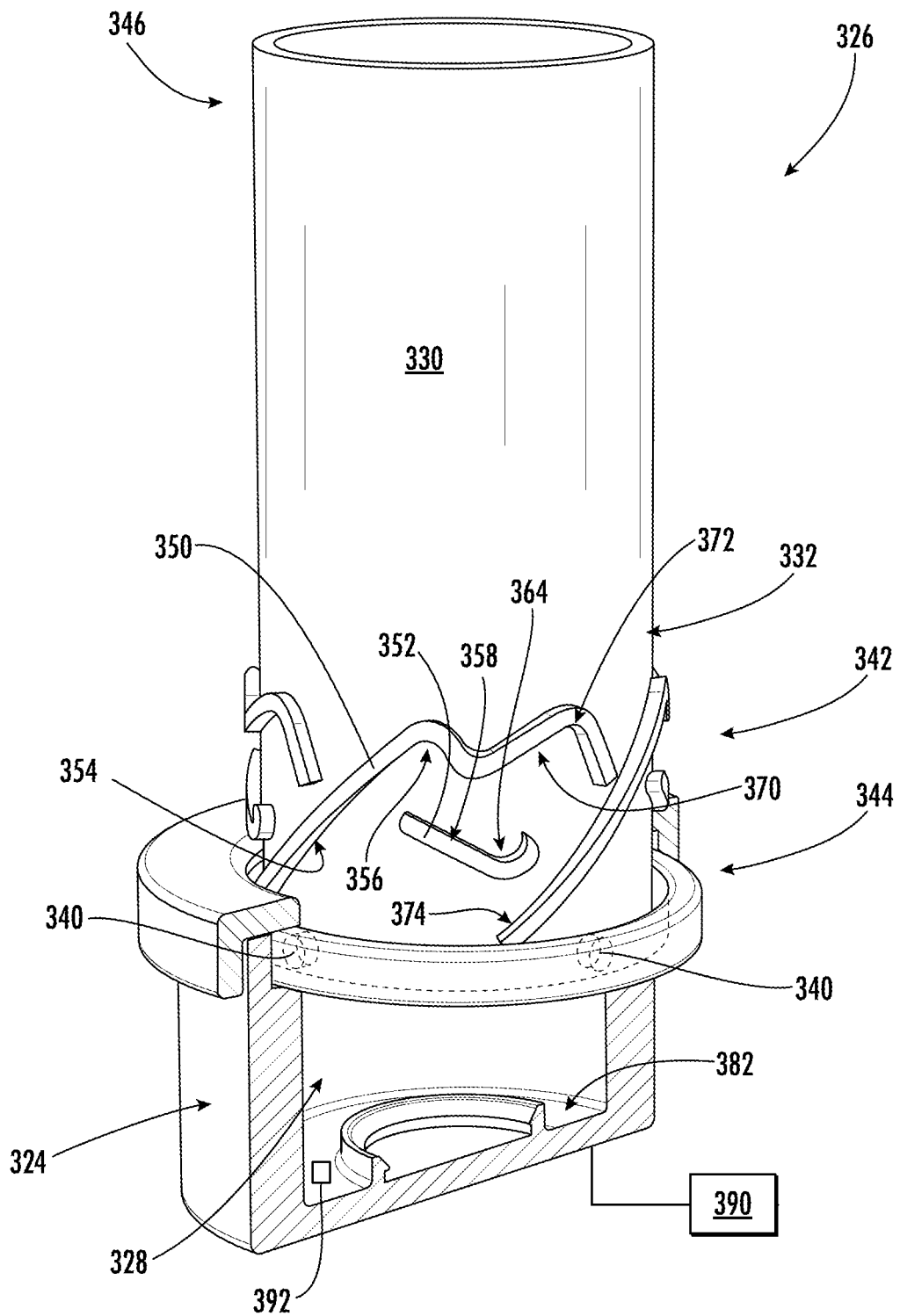
FIG. 15 provides a partial perspective view of the exemplary nutrient cartridge of FIG. 12 engaging the exemplary nutrient cartridge assembly according to another exemplary embodiment of the present subject matter, with the nutrient cartridge in the disengaged position.
Figure 16:
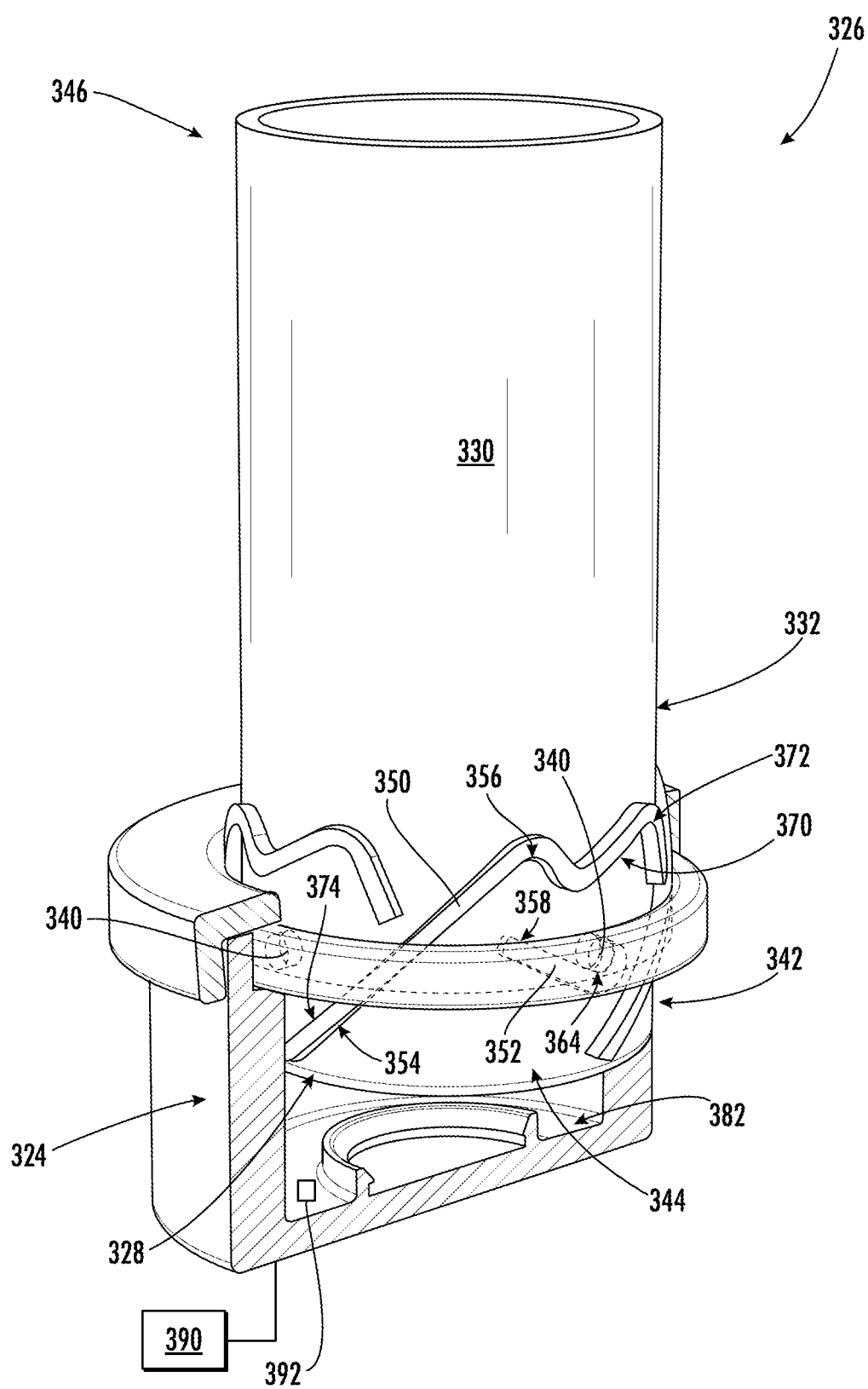
FIG. 16 provides a partial perspective view of the exemplary nutrient cartridge of FIG. 12 engaging the exemplary nutrient cartridge assembly according to another exemplary embodiment of the present subject matter, with the nutrient cartridge in the engaged position.

As best shown in FIGS. 5 and 7, grow module 200 may further include an internal divider 250 that is positioned within root chamber 244 to divide root chamber 244 into a plurality of root chambers, each of the plurality of root chambers being in fluid communication with one of the plurality of grow chambers 210 through the plurality of apertures 240. More specifically, according to the illustrated embodiment, internal divider 250 may divide root chamber 244 into a first root chamber 252, a second root chamber 254, and a third root chamber 256. According to an exemplary embodiment, first root chamber 252 may provide water and nutrients to plants 124 positioned in the first grow chamber 212, second root chamber 254 may provide water and nutrients to plants 124 positioned in the second grow chamber 214, and third root chamber 256 may provide water and nutrients to plants 124 positioned in the third grow chamber 216. In this manner, environmental control system 148 may control the temperature and/or humidity of each of the plurality of chambers 212-216 and the plurality of root chambers 252-256 independently of each other.

Notably, environmental control system 148 described above is generally configured for regulating the temperature and humidity (e.g., or some other suitable water level quantity or measurement) within one or all of the plurality of chambers 210 and/or root chambers 252-256 independently of each other. In this manner, a versatile and desirable growing environment may be obtained for each and every chamber 210.

Referring now for example to FIGS. 4 and 5, gardening appliance 100 may further include a light assembly 280 which is generally configured for providing light into selected grow chambers 210 to facilitate photosynthesis and growth of plants 124. As shown, light assembly 280 may include a plurality of light sources 282 stacked in an array, e.g., extending along the vertical direction V. For example, light sources 282 may be mounted directly to liner 120 within grow chamber 122, or may alternatively be positioned behind liner 120 such that light is projected through a transparent window or light pipe into grow chamber 122. The position, configuration, and type of light sources 282 described herein are not intended to limit the scope of the present subject matter in any manner.

Light sources 282 may be provided as any suitable number, type, position, and configuration of electrical light source(s), using any suitable light technology and illuminating in any suitable color. For example, according to the illustrated embodiment, light source 282 includes one or more light emitting diodes (LEDs), which may each illuminate in a single color (e.g., white LEDs), or which may each illuminate in multiple colors (e.g., multi-color or RGB LEDs) depending on the control signal from controller 174. However, it should be appreciated that according to alternative embodiments, light sources 282 may include any other suitable traditional light bulbs or sources, such as halogen bulbs, fluorescent bulbs, incandescent bulbs, glow bars, a fiber light source, etc.

As explained above, light generated from light assembly 280 may result in light pollution within a room where gardening appliance 100 is located. Therefore, aspects of the present subject matter are directed to features for reducing light pollution, or to the blocking of light from light sources 282 through front display opening 132. Specifically, as illustrated, light assembly 280 is positioned only within the enclosed back portion 130 of liner 120 such that only grow chambers 210 which are in a sealed position are exposed to light from light sources 282. Specifically, grow module 200 acts as a physical partition between light assemblies 280 and front display opening 132. In this manner, as illustrated in FIG. 5, no light may pass from first chamber 212 or second chamber 214 through grow module 200 and out front display opening 132. As grow module 200 rotates, two of the three grow chambers 210 will receive light from light assembly 280 at a time. According still other embodiments, a single light assembly may be used to reduce costs, whereby only a single grow chamber 210 will be lit at a single time.

Gardening appliance 100 and grow module 200 have been described above to explain an exemplary embodiment of the present subject matter. However, it should be appreciated that variations and modifications may be made while remaining within the scope of the present subject matter. For example, according to alternative embodiments, gardening appliance 100 may be a simplified to a two-chamber embodiment with a square liner 120 and a grow module 200 having two partitions 206 extending from opposite sides of central hub 202 to define a first grow chamber and a second grow chamber. According to such an embodiment, by rotating grow module 200 by 180 degrees about central axis 206, the first chamber may alternate between the sealed position (e.g., facing rear side 114 of cabinet 102) and the display position (e.g., facing front side 112 of cabinet 102). By contrast, the same rotation will move the second chamber from the display position to the sealed position.

According to still other embodiments, gardening appliance 100 may include a three chamber grow module 200 but may have a modified cabinet 102 such that front display opening 132 is wider and two of the three grow chambers 210 are displayed at a single time. Thus, first chamber 212 may be in the sealed position, while second chamber 214 and third chamber 216 may be in the display positions. As grow module 200 is rotated counterclockwise, first chamber 212 is moved into the display position and third chamber 216 is moved into the sealed position.

Referring now also to FIGS. 9 through 17, a hydration system 300 will be described according to an exemplary embodiment of the present subject matter. In general, hydration system 300 may be used to provide a mist or flow of nutrient rich liquid into grow chamber 122 to facilitate plant growth. For example, continuing the example from above, hydration system 300 may be a part or subsystem of environmental control system 148 of gardening appliance 100. Although hydration system 300 is described herein in the context of gardening appliance 100, it should be appreciated that aspects of the present subject matter may be used to provide hydration and/or nutrients to plants in any other gardening appliance or in any other application where it is desirable to selectively provide desirable quantities and concentrations of hydration, nutrients, and/or other fluids onto plants to facilitate improved plant growth.

The figures provided herein include schematic illustrations of hydration system 300 to facilitate discussion of aspects of the present subject matter. However, it should be appreciated that variations and modifications may be made to hydration system 300 while remaining within the scope of the present subject matter. For example, grow module 200 may take any other form and may have any other suitable number and size of apertures. In addition, any other suitable size, number, and orientation of discharge nozzles may be used. Moreover, the plumbing configuration for providing flows of water, air, and/or nutrients to hydration system 300 may vary.

In general, hydration system 300 includes a discharge nozzle 302 (e.g., such as a fine mist spray nozzle or nozzles) that is fluidly coupled to a water supply, such as a mixing tank 304. According to the illustrated embodiment, mixing tank 304 is supplied with the desired mixture of water and/or nutrients for optimal growth of plants 124. It should be appreciated that mixing tank 304 may itself be fluidly coupled to a water supply (not shown), such as a reservoir containing water (e.g., distilled water) or a municipal water supply. In addition, mixing tank 304 may be fluidly coupled to a nutrient dispensing assembly (e.g., such as nutrient cartridge system 320, described below) that may be provide the desired amount or concentration of nutrients within mixing tank 304.

Hydration system 300 may further include a liquid pump 306 that is fluidly coupled to mixing tank 304 and is configured for directing a flow of nutrients 308 into discharge nozzle 302. In addition, according to an exemplary embodiment, hydration system 300 includes an air pump 310 or another suitable pressurized air source for providing a flow of air 312 to discharge nozzle 302. Discharge nozzle 302 is generally configured for receiving the flow of nutrients 308 and the flow of air 312 and generating a mist of nutrients (e.g., identified herein by reference numeral 314). Specifically, discharge nozzle 302 selectively discharges nutrients in a high pressure, atomized, and/or ionized mist with droplets that are optimally sized for root absorption. Any suitable type and configuration of nozzle may be used to generate a mist 314 containing droplets that are carefully sized to be small enough where the force of gravity is mostly offset by the viscous forces of the air and the droplets are more or less neutrally buoyant. In addition, these droplets may be optimally sized for easy uptake by the roots of the plants.

Discharge nozzle 302 may be positioned at any suitable location within grow chamber 122, such as at a top of root chamber 244. Alternatively, hydration system 300 may include a plurality of discharge nozzles 302 spaced apart along the vertical direction V within each of root chambers 252-256. According to exemplary embodiments, hydration system 300 may include any suitable number, type, and position of discharge nozzles 302 for improving the distribution of the mist of nutrients 314. It should be appreciated that discharge nozzle 302 is configured for generating the mist of nutrients 314 that includes a high pressure atomized and ionized fluid or mist including both water and/or nutrients. In this manner, discharge nozzle 302 charges root chamber 244 with mist 314 for hydrating the roots of plants 124.

As noted above, nutrient cartridge system 320 may generally be configured for providing the desired type, quantity, and concentration of nutrients (e.g., identified herein generally by reference numeral 322) to hydration system 300 to facilitate proper plant growth. As best shown in FIG. 2, nutrient cartridge system 320 may be housed largely within bottom drawer 138 of gardening appliance 100. In this manner, a user may load bottom drawer 138 with the desired nutrients such that nutrient cartridge system 320 and hydration system 300 may thereafter dispense or selectively charge grow chamber 122 with mist of nutrients 314 with reduced user interaction. Although an exemplary nutrient cartridge system 320 is described below, it should be appreciated that variations and modifications may be made to nutrient cartridge system 320 while remaining within the scope of the present subject matter. For example, nutrient cartridge system 320 may be configured for receiving more or fewer nutrient cartridges, the manner of engagement between a manifold and the nutrient cartridges may vary, the position of such cartridges may be moved, etc.

Referring now generally to FIGS. 9 through 17, nutrient cartridge assembly 320 may generally include manifold 324 that is positioned within bottom drawer 138 and is configured for receiving one or more nutrient cartridges 326. Nutrient cartridges 326 may be any suitable receptacle for containing and dispensing one or more nutrients or mixes of nutrients for use by hydration system 300. As shown, nutrient cartridge system 320 is configured for receiving six nutrient cartridges 326, each of which may contain a different nutrient. In this regard, manifold 324 defines six distinct cartridge receptacles 328, each of the cartridge receptacles 328 being configured for receiving one nutrient cartridge 326. Although the engagement of a single nutrient cartridge 326 in a single cartridge receptacle 328 will be described below, it should be appreciated that each cartridge receptacle 328 may have the same features or may be designed for receiving aa common cartridge type. By contrast, according to alternative embodiments, each cartridge receptacle 328 may have a slightly different design or configuration and may be capable of receiving only a compatible nutrient cartridge 326. Other variations and modifications are possible and within the scope of the present subject matter.

According to the illustrated embodiment, cartridge receptacle 328 is a substantially cylindrical void for receiving a nutrient cartridge 326. Similarly, nutrient cartridge 326 generally includes a cartridge housing 330 that includes a cylindrical outer surface 332. According to an exemplary embodiment, a nutrient bag 334 may be positioned within the cartridge housing 330 for selectively dispensing nutrients 322 contained therein, as described in more detail below. According to alternative exemplary embodiments, nutrients 322 are contained directly within cartridge housing 330.

According to exemplary embodiment of the present subject matter, cartridge housing 330 is generally configured for engaging and interacting with manifold 324 such that pushing nutrient cartridge 326 into cartridge receptacle 328 along an axial direction A causes the manifold 324 to engage and secure nutrient cartridge 326 in a latched position. In this regard, while nutrient cartridge 326 is pushed along the axial direction A, manifold 324 engages nutrient cartridge 326 to cause relative rotation between manifold 324 and nutrient cartridge 326 about the axial direction to a circumferential position (i.e., the "latched" position) where it may no longer be removed from cartridge receptacle 328. In addition, pushing nutrient cartridge 326 from the latched position into cartridge receptacle 328 along the axial direction A facilitates further relative rotation between manifold 324 and nutrient cartridge 326 to permit subsequent removal nutrient cartridge 326 from cartridge receptacle 328. Various structures and features may be used to facilitate such interaction between manifold 324 and nutrient cartridges 326, only one example of which is described below for the purpose of explaining aspects of the present subject matter. For example, according to one exemplary embodiment, manifold 324 may define features that rotate to accept nutrient cartridge 326. In addition, or alternatively, nutrient cartridge 326 may be rotated or have rotatable features for receipt within one or more fixed features of manifold 324.

According to the illustrated embodiment, manifold 324 defines one or more follower pins 340 that extend into cartridge receptacle 328 along a radial direction R. These follower pins 340 are generally configured for engaging a corresponding track system 342 that is defined on cylindrical outer surface 332 of a bottom end 344 of nutrient cartridge 326. Track system 342 may extend outward along the radial direction R for engaging follower pins 340. According to an exemplary embodiment, follower pins 340 are mounted to a rotatable ring that is positioned within a circumferential slot within manifold 324. In this manner, follower pins 340 are fixed along the axial direction A but rotatable in the circumferential direction C. Thus, a user may push nutrient cartridge 326 from a handle defined on top end 346 into cartridge receptacle 328 along the axial direction A. This axial force causes track system 342 and follower pins 340 to interact in a manner that causes relative rotation between follower pins 340 and nutrient cartridge 326, thereby securing nutrient cartridge 326 into the latched position within manifold 324. It should be appreciated that according to an exemplary embodiment, follower pins 340 may be fixed such that nutrient cartridge 326 is rotated in the circumferential direction C when inserted into cartridge receptable 328.

As best shown in FIGS. 14 through 17, nutrient system 320 includes four corresponding sets of follower pins 340 and track systems 342, each being positioned within a single quadrant along a circumferential direction C, e.g., spaced apart by 90° from each other. However, it should be appreciated that any suitable number of follower pins 340 and track systems 342 may be used while remaining within the scope of the present subject matter. For example, according to alternative embodiments, a single follower pin 340 and a single-track system 342 may be used to properly align and install each nutrient cartridge 326 within manifold 324. In addition, it should be appreciated that other structures may be used for follower pins 340 and track system 342 to facilitate engagement between nutrient cartridge 326 and manifold 324.

As noted above, nutrient cartridge 326 is insertable into cartridge receptacle 328 along the axial direction A such that track system 342 engages follower pin 340 to cause relative rotation between follower pins 340 and nutrient cartridge 326 to orient nutrient cartridge 326 into the latched position. Although an exemplary structure and engagement mechanisms is described below, it should be appreciated that variations and modifications may be made to the structure while remaining within the scope of the present subject matter. According to the illustrated embodiment, track system 342 generally includes a guiding cam 350 and a latching cam 352 which are designed to interact with follower pin 340 within a given quadrant of cartridge receptacle 328. An exemplary configuration of guiding cam 350 latching cam 352 will be described below.

As shown, guiding cam 350 is generally positioned closer to top end 346 of nutrient cartridge 326 relative to latching cam 352. In this manner, guiding cam 350 is generally configured for engaging follower pin 340 to prevent the insertion of nutrient cartridge 326 along the axial direction A past a particular axial position, e.g., depending on the circumferential orientation nutrient cartridge 326. By contrast, a latching cam 352 is generally configured for engaging follower pin 340 to prevent removal of nutrient cartridge 326 when nutrient cartridge 326 is another circumferential position (e.g., the latched position).

As best shown schematically in FIG. 17, guiding cam 350 generally has in the inverted "W" shape with the one end being elongated. By contrast, latching cam 352 generally has an upright "V" shape with one end being elongated. Specifically, guiding cam 350 and latching cam 352 collectively define first lower surfaces 354 that will engage follower pin 340 regardless of the circumferential position of nutrient cartridge 326 when inserted into cartridge receptacle 328. In this regard, the initial position (e.g., as identified in FIG. 17 by "0") will always be circumferentially aligned with the first lower surface 354 of guiding cam 350 or latching cam 352.

The first lower surface 354 of latching cam 352 is generally sloped toward first lower surface 354 of guiding cam 350 such that axial movement and engagement between the latching cam 352 and follower pin 340 rotates nutrient cartridge counter clockwise (CCW) until the follower pin 340 engages first lower surface 354 of guiding cam 350. Once follower pin 340 engages first lower surface 354 of guiding cam 350, nutrient cartridge 326 will rotate clockwise (CW) to a first circumferential position (e.g., identified by number "1" in FIG. 17), e.g., corresponding to a stopping notch 356 of guiding cam 350. Notably, once follower pin 340 is engaged in stopping notch 356, further axial movement into cartridge receptacle 328 is stopped and the nutrient cartridge 326 stops rotating.

After nutrient cartridge 326 has been inserted into cartridge receptacle 328 and moved to the first circumferential position, moving nutrient cartridge 326 out of cartridge receptacle 328 along the axial direction A will cause follower pin 340 to engage upper surface 358 of latching cam 352. In this regard, for example, latching cam 352 may extend through the first circumferential position of nutrient cartridge 326 within cartridge receptacle 328, such that when follower pin 340 is seated in stopping notch 356, it is also positioned over latching cam 352 (e.g., along the axial direction A). Thus, when nutrient cartridge 326 is in the first circumferential position, moving nutrient cartridge 326 out from cartridge receptacle 328 along the axial direction A will cause follower pin 340 to engage latching cam 352.

Notably, according to an exemplary embodiment of the present subject matter, nutrient cartridge assembly 320 may include a resilient element 360 that is positioned within cartridge receptacle 328 and is configured for urging nutrient cartridge 326 out of cartridge receptacle 328 along the axial direction A. For example, according to the illustrated embodiment, resilient element 360 is a coiled mechanical spring 362. However, it should be appreciated that any other suitable resilient elements or structures for urging nutrient cartridge 326 out of cartridge receptacle 328 may be used while remaining within the scope of the present subject matter.

Notably, as resilient element 360 urges nutrient cartridge 326 outward from cartridge receptacle 328 along the axial direction A, follower pin 340 engages upper surface 358 such that follower pin 340 will rotate nutrient cartridge 326 clockwise CW to a second circumferential position (e.g., identified by number "2" in FIG. 17), e.g., corresponding to a latching notch 364 defined in the "V" of latching cam 352. Notably, when follower pin 340 engages latching notch 364, nutrient cartridge 326 is in the "latched" position and resilient element 360 urges follower pin 340 into latching notch 364 to maintain the latched position during operation. As noted below, manifold 324 is also fluidly coupled to cartridge housing 330 for extracting nutrients 322 when nutrient cartridge 326 is in the latched position.

After nutrient cartridge 326 is in the latched position, a user may remove nutrient cartridge 326 by once again pressing inward along the axial direction A and then pulling outward along the axial direction A. Specifically, guiding cam 350 may define a second lower surface 370 that is positioned at the second circumferential position, e.g., over latching notch 364 along the axial direction A. In this manner, pushing nutrient cartridge 326 into cartridge receptacle 328 along the axial direction A from latching notch 364 causes follower pin 340 to engage second lower surface 370 to rotate nutrient cartridge 326 along the circumferential direction C until follower pin 340 reaches a removal notch 372 defined by guiding cam 350. Notably, removal notch 372 is defined at a third circumferential position (e.g., identified by number "3" in FIG. 17). After follower pin 340 engages removal notch 372, further axial movement of nutrient cartridge 326 into cartridge receptacle 328 is prevented. Notably, however, the third circumferential position of removal notch 372 is positioned outside latching cam 352 along circumferential direction. In this manner, pulling nutrient cartridge 326 (e.g., or permitting resilient element 360 to push nutrient cartridge 326) out of cartridge receptacle 326 from the third circumferential position permits the removal of nutrient cartridge 326. Specifically, as illustrated, follower pin 340 may engage an upper surface 374 of and adjacent guiding cam 350, e.g., the end of guiding cam 350 from an adjacent quadrant of track system 342. As nutrient cartridge 326 is pulled outward along the axial direction A, the engagement of follower pin 340 and upper surface 374 may cause counterclockwise movement of nutrient cartridge 326 until follower pin 340 is clear of guiding cam and nutrient cartridge 326 may be removed from cartridge receptacle 328.

According to an exemplary embodiment, nutrient cartridge system 320 includes a docking port 380 that is defined in a bottom 382 of manifold 324. Docking port 380 may be configured for engaging a discharge port 384 defined on bottom end 344 of nutrient cartridge 326. Specifically, according to the illustrated embodiment, docking port 380 is a cylindrical boss received within a corresponding cylindrical discharge port 384 when nutrient cartridge 326 is in the latched position, such that a fluid seal is formed there between. It should be appreciated that docking port 380 may be fluidly coupled to hydration system 300, such as directly to mixing tank 304, liquid pump 306, etc. In this manner, hydration system 300 may draw nutrients 322 from nutrient cartridge 326 via discharge port 384 and docking port 380.

According still other embodiments, nutrient cartridge 326 may include a flexible seal 386 such as a flapper valve or other suitable resilient member. Flexible seal 386 may be displaced when docking port 380 is inserted through discharge port 384, such that a fluid seal is formed between manifold 324 and nutrient cartridge 326. In addition, according to an exemplary embodiment, nutrient cartridge 326 may define a one-way valve 388 proximate top end 346 of nutrient cartridge 326. In this regard, one-way valve 388 may permit air to enter cartridge housing 330, e.g., to prevent an airlock that might prevent further discharge of nutrient 322.

Notably, nutrient cartridge system 320 may further include features to facilitate detection of the type or amount of nutrients 322 within nutrient cartridge 326. For example, according to an exemplary embodiment, nutrient cartridge assembly 320 may include a fluid level sensor for detecting a fluid level in nutrient cartridge 326. It should be appreciated that any suitable number, type, and configuration of level sensors may be used. For example, according to an exemplary embodiment, the fluid level sensor is a pressure sensor 390. In this regard, pressure sensor 390 may be positioned within manifold 324 or within nutrient cartridge 326 for measuring a weight of nutrients 322, from which a nutrient level may be determined. This information may be used, for example, to provide a user notification when a nutrient cartridge 326 should be replaced or refilled.

According to another exemplary embodiment, nutrient cartridge 326 may be color-coded based on the type of nutrients 322 that are contained within nutrient cartridge 326. In this regard, for example, nutrient cartridge assembly 320 may include an optical sensor 392 is positioned and configured for detecting a color of nutrient cartridge 326 or of a particular location on nutrient cartridge 326. In addition, a controller, such as controller 174 may be configured for determining the type of nutrient 322 based on the color detected by optical sensors 392. In this manner, controller 174 may determine the amount and type of nutrients 322 within nutrient cartridge assembly 320 at any time.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gardening appliance, comprising:
a liner positioned within a cabinet and defining a grow chamber;
a grow module mounted within the liner and defining a pod aperture, the pod aperture being configured for receiving a plant pod;
a hydration system comprising a discharge nozzle for selectively spraying a mist of nutrients into the grow chamber; and
a nutrient cartridge assembly for providing nutrients to the hydration system, the nutrient cartridge assembly comprising:
a manifold defining a cartridge receptacle and a follower pin that extends inward to the cartridge receptacle along a radial direction; and
a nutrient cartridge comprising a cylindrical outer surface that defines a track system that protrudes outward along the radial direction, the nutrient cartridge being insertable into the cartridge receptacle along an axial direction such that the track system engages the follower pin to place the nutrient cartridge into a latched position, wherein the track system comprises:
a guiding cam for engaging the follower pin to cause relative rotation between the follower pin and the nutrient cartridge in a circumferential direction when the nutrient cartridge is pushed into the cartridge receptacle along the axial direction, the guiding cam defining a stopping notch at a first circumferential position; and
a latching cam defining an upper surface extending through the first circumferential position such that pulling the nutrient cartridge out of the cartridge receptacle along the axial direction causes the follower pin to engage the upper surface to cause relative rotation of the follower pin and the nutrient cartridge to move the follower pin into a latching notch defined at a second circumferential position and being configured for receiving the follower pin when the nutrient cartridge is in the latched position.

2. The gardening appliance of claim 1, wherein the guiding cam defines a removal notch, wherein pushing the nutrient cartridge into the cartridge receptacle from the latched position causes relative rotation between the follower pin and the nutrient cartridge to place the follower pin in a third circumferential position and in engagement with the removal notch, and wherein the removal notch is outside the latching cam along the circumferential direction, such that the nutrient cartridge may be removed along the axial direction from the cartridge receptacle from the third circumferential position.

3. The gardening appliance of claim 1, wherein the nutrient cartridge assembly further comprises:
a resilient element positioned within the cartridge receptacle for urging the nutrient cartridge out of the cartridge receptacle, and wherein the resilient element locks the follower pin into a latching notch of the track system.

4. The gardening appliance of claim 3, wherein the resilient element comprises a coiled mechanical spring.

5. The gardening appliance of claim 1, wherein the nutrient cartridge assembly further comprises:
a docking port defined in a bottom of the manifold, the docking port being configured for engaging a discharge port of the nutrient cartridge when the nutrient cartridge is in the latched position.

6. The gardening appliance of claim 5, wherein the nutrient cartridge comprises:
a flexible seal positioned over the discharge port, wherein the docking port displaces the flexible seal when the nutrient cartridge is in the latched position.

7. The gardening appliance of claim 1, wherein the nutrient cartridge comprises:
a one-way valve positioned proximate a top of the nutrient cartridge.

8. The gardening appliance of claim 1, wherein the nutrient cartridge comprises:
a cartridge housing; and
a bag positioned within the cartridge housing for receiving the nutrients.

9. The gardening appliance of claim 1, wherein the nutrient cartridge assembly comprises:
a fluid level sensor for detecting a fluid level in the nutrient cartridge.

10. The gardening appliance of claim 1, wherein the nutrient cartridge is color-coded based on a type of nutrient contained within the nutrient cartridge, and wherein the nutrient cartridge assembly comprises:
an optical sensor for detecting a color of the nutrient cartridge; and
a controller for determining the type of nutrient based on the color of the nutrient cartridge.

11. The gardening appliance of claim 1, wherein the manifold defines four follower pins spaced apart in four quadrants along a circumferential direction, and wherein the cartridge defines four corresponding track systems for engaging the four follower pins.

12. The gardening appliance of claim 1, wherein the manifold defines a plurality of cartridge receptacles for receiving a plurality of nutrient cartridges.

13. The gardening appliance of claim 1, wherein the hydration system comprises:
a mixing tank fluidly coupled to the cartridge receptacle for receiving nutrients from the nutrient cartridge; and
a liquid pump fluidly coupled to the mixing tank for urging the mist of nutrients.

14. A nutrient cartridge system for a gardening appliance, the nutrient cartridge system defining an axial direction, a radial direction, and a circumferential direction, the nutrient cartridge system comprising:
a manifold defining a cartridge receptacle and a follower pin that extends inward to the cartridge receptacle along the radial direction; and
a nutrient cartridge comprising a cylindrical outer surface that defines a track system that protrudes outward along the radial direction, the nutrient cartridge being insertable into the cartridge receptacle along the axial direction such that the track system engages the follower pin to place the nutrient cartridge into a latched position, wherein the track system comprises:
a guiding cam for engaging the follower pin to cause relative rotation between the follower pin and the nutrient cartridge in the circumferential direction when the nutrient cartridge is pushed into the cartridge receptacle along the axial direction, the guiding cam defining a stopping notch at a first circumferential position; and
a latching cam defining an upper surface extending through the first circumferential position such that pulling the nutrient cartridge out of the cartridge receptacle along the axial direction causes the follower pin to engage the upper surface to cause relative rotation of the follower pin and the nutrient cartridge to move the follower pin into a latching notch defined at a second circumferential position and being configured for receiving the follower pin when the nutrient cartridge is in the latched position.

15. The nutrient cartridge system of claim 14, wherein the guiding cam defines a removal notch, wherein pushing the nutrient cartridge into the cartridge receptacle from the latched position causes relative rotation between the follower pin and the nutrient cartridge to place the follower pin in a third circumferential position and in engagement with the removal notch, and wherein the removal notch is outside the latching cam along the circumferential direction, such that the nutrient cartridge may be removed along the axial direction from the cartridge receptacle from the third circumferential position.

16. The nutrient cartridge system of claim 14, further comprising:
a resilient element positioned within the cartridge receptacle for urging the nutrient cartridge out of the cartridge receptacle, and wherein the resilient element locks the follower pin into a latching track of the track system.

17. The nutrient cartridge system of claim 14, further comprising:
a docking port defined in a bottom of the manifold, the docking port being configured for engaging a discharge port of the nutrient cartridge when the nutrient cartridge is in the latched position;
a flexible seal positioned over the discharge port, wherein the docking port displaces the flexible seal when the nutrient cartridge is in the latched position; and
a one-way valve positioned proximate a top of the nutrient cartridge.

18. The nutrient cartridge system of claim 14, wherein the manifold defines four follower pins spaced apart in four quadrants along a circumferential direction, and wherein the cartridge defines four corresponding track systems for engaging the four follower pins.

19. A gardening appliance, comprising:
a liner positioned within a cabinet and defining a grow chamber;
a grow module mounted within the liner and defining a pod aperture, the pod aperture being configured for receiving a plant pod;
a hydration system comprising a discharge nozzle for selectively spraying a mist of nutrients into the grow chamber; and
a nutrient cartridge assembly for providing nutrients to the hydration system, the nutrient cartridge assembly comprising:

a manifold defining a cartridge receptacle and a follower pin that extends inward to the cartridge receptacle along a radial direction;

a nutrient cartridge comprising a cylindrical outer surface that defines a track system that protrudes outward along the radial direction, the nutrient cartridge being insertable into the cartridge receptacle along an axial direction such that the track system engages the follower pin to place the nutrient cartridge into a latched position, wherein the nutrient cartridge is color-coded based on a type of nutrient contained within the nutrient cartridge;

an optical sensor for detecting a color of the nutrient cartridge; and a controller for determining the type of nutrient based on the color of the nutrient cartridge.

20. The gardening appliance of claim 19, wherein the manifold defines a plurality of cartridge receptacles for receiving a plurality of nutrient cartridges.

* * * * *